(12) United States Patent
Okada et al.

(10) Patent No.: US 7,084,380 B2
(45) Date of Patent: Aug. 1, 2006

(54) RAW TIRE PREHEATING METHOD AND APPARATUS THEREFOR

(75) Inventors: Kazuto Okada, Kobe (JP); Hisashi Mitamura, Takasago (JP); Kenichi Inoue, Kobe (JP); Shigeto Adachi, Takasago (JP)

(73) Assignee: Kabushiki Kaisha Kobe Seiko Sho, Kobe (JP)

( * ) Notice: Subject to any disclaimer, the term of this patent is extended or adjusted under 35 U.S.C. 154(b) by 0 days.

(21) Appl. No.: 10/381,435

(22) PCT Filed: Jul. 2, 2002

(86) PCT No.: PCT/JP02/06687
§ 371 (c)(1),
(2), (4) Date: Mar. 31, 2003

(87) PCT Pub. No.: WO03/004240
PCT Pub. Date: Jan. 16, 2003

(65) Prior Publication Data
US 2003/0183622 A1 Oct. 2, 2003

(30) Foreign Application Priority Data
Jul. 2, 2001 (JP) .................................. 2001-200560
Feb. 26, 2002 (JP) .................................. 2002-049200

(51) Int. Cl.
*H05B 6/02* (2006.01)
*H05B 6/10* (2006.01)

(52) U.S. Cl. ................. 219/635; 219/672; 264/486; 425/17; 425/174.8 R

(58) Field of Classification Search .............. 219/635, 219/672, 601, 619, 216, 634, 618, 494, 469, 219/471; 425/17, 174.8 R, 174.4, 40, 42, 425/43, 48, 50, 51, 52; 264/486, 315, 326
See application file for complete search history.

(56) References Cited

U.S. PATENT DOCUMENTS

| 1,379,595 | A | * | 5/1921 | Post |
| 1,566,500 | A | | 12/1925 | Northrup |
| 2,451,992 | A | | 10/1948 | Te Grotenhuis |
| 4,699,578 | A | * | 10/1987 | Sumner et al. ............... 425/33 |
| 5,023,419 | A | * | 6/1991 | Langstedt ................... 219/642 |
| 2002/0015746 | A1 | * | 2/2002 | Mitamura et al. ............ 425/50 |

FOREIGN PATENT DOCUMENTS

DE 39 11 082 10/1990

(Continued)

OTHER PUBLICATIONS

Patent Abstract of Japan, vol. 1998, No. 10, Aug. 31, 1998 & JP 10 138259 A (Kobe Steel LTD), May 26, 1998 *abstract*.*

Patent Abstract of Japan, vol. 1996, No. 7, Jul. 1996 & JP 08 064353 A (Canon INC), Mar. 8, 1996 *abstract*.*

*Primary Examiner*—Quang T. Van
(74) *Attorney, Agent, or Firm*—Oblon, Spivak, McClelland, Maier & Neustadt, P.C.

(57) ABSTRACT

A raw tire-preheating method and apparatus for preheating a raw tire uniformly over all the areas with a reduced running cost. The raw tire-preheating apparatus comprises a tread section-preheating mechanism (16) including a front coil (21) disposed so as to face a tread section (4*a*) for generating a high frequency magnetic field and for applying it to the tread section (4*a*); and a core mechanism consisting of center cores (24), separation cores (25) and side cores (26) for providing an intensity distribution of the high frequency magnetic field that the tread section (4*a*) is uniformly preheated overall in the tire width direction. A movement mechanism for moving at least one of the tread section-preheating mechanism (16) and the raw tire (4) is provided in order to move the tread section-preheating mechanism (16) relative to the tread section (4*a*).

13 Claims, 30 Drawing Sheets

FOREIGN PATENT DOCUMENTS

| | | | |
|---|---|---|---|
| DE | 39 24 145 A1 * | 1/1991 |
| EP | 0 585 629 A * | 3/1994 |
| EP | 0 749 267 * | 12/1996 |
| EP | 1 053 861 A * | 11/2000 |
| GB | 2 200 085 | 7/1988 |
| JP | 7-96525 | 4/1995 |
| JP | 10-128764 | 5/1998 |
| JP | 10-138259 | 5/1998 |
| JP | 2000-61963 | 2/2000 |
| JP | 2001-32016 | 2/2001 |
| WO | 99/08860 A * | 2/1999 |

* cited by examiner

FIG. 7
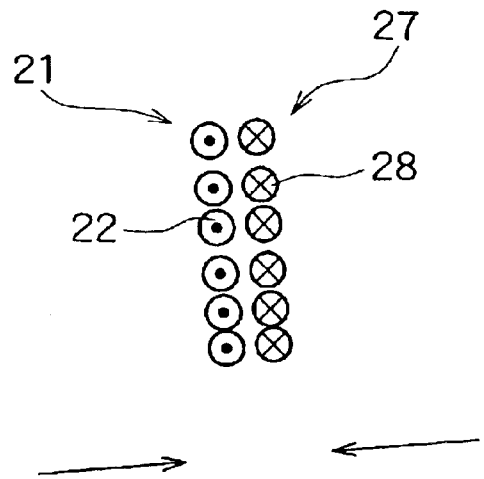
RAW TIRE SIDE
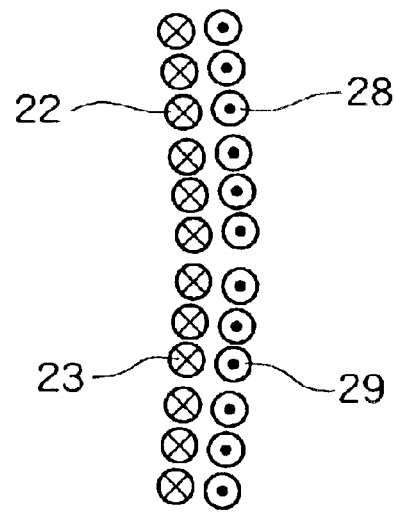
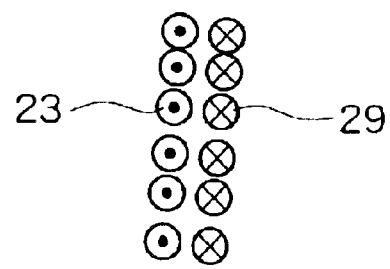

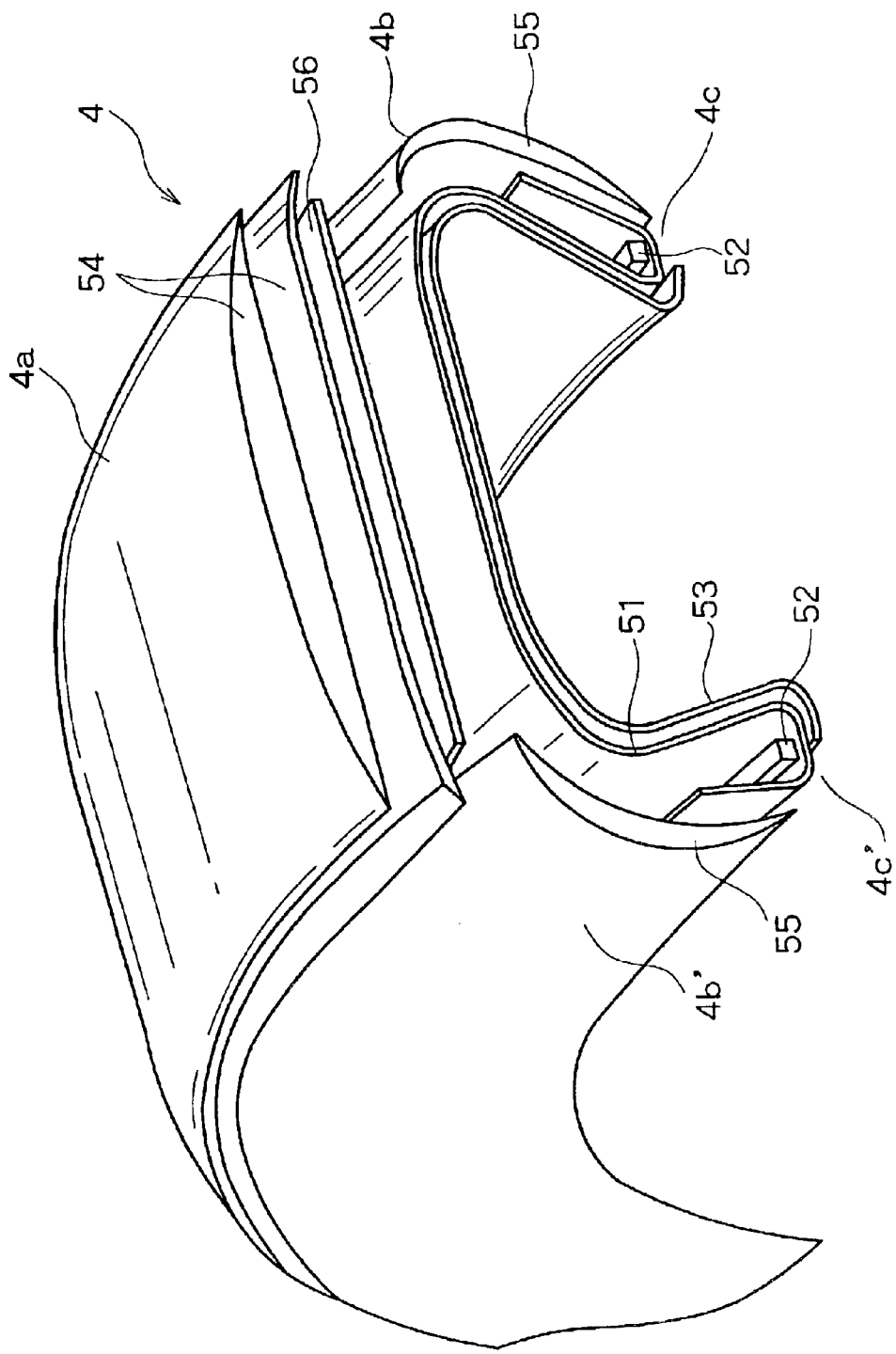

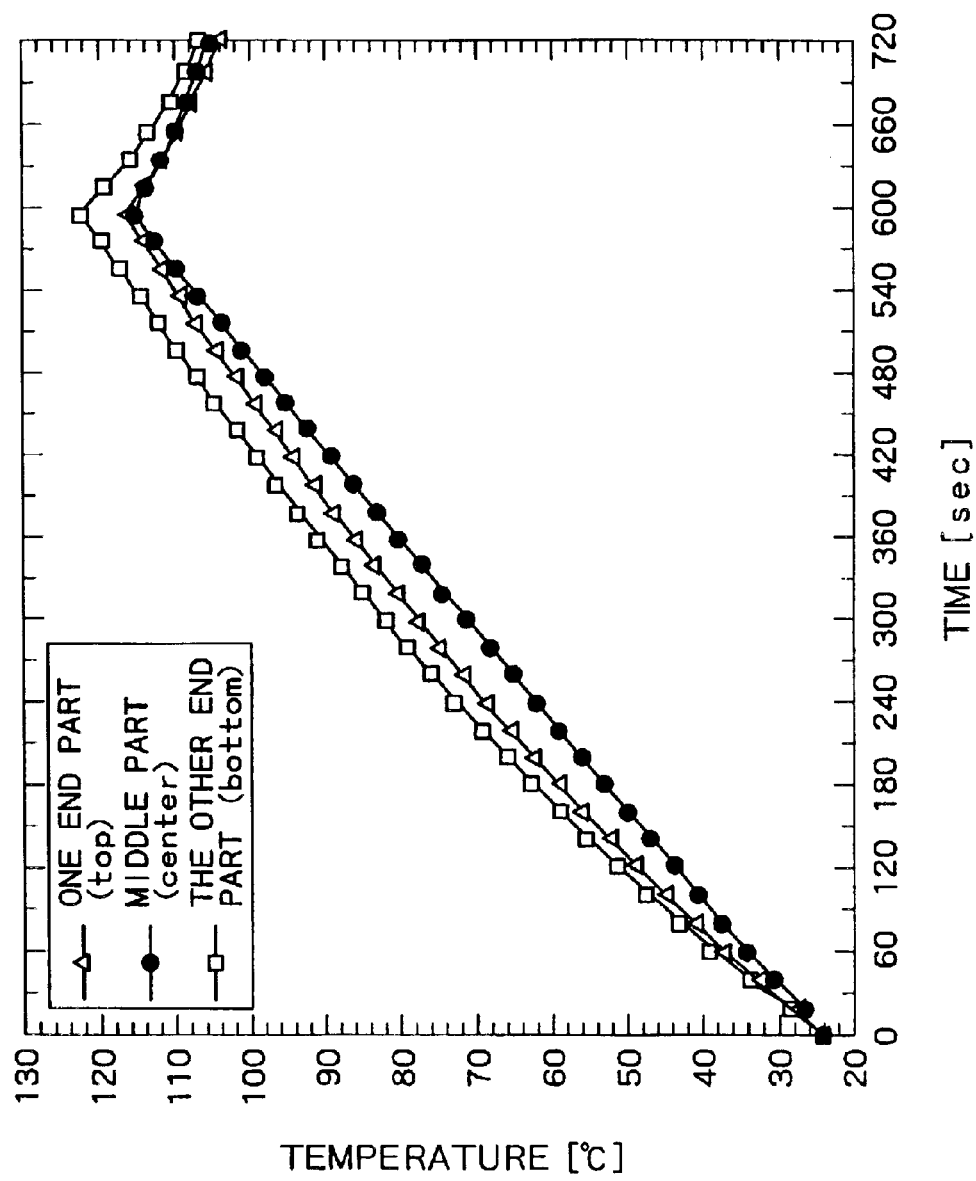

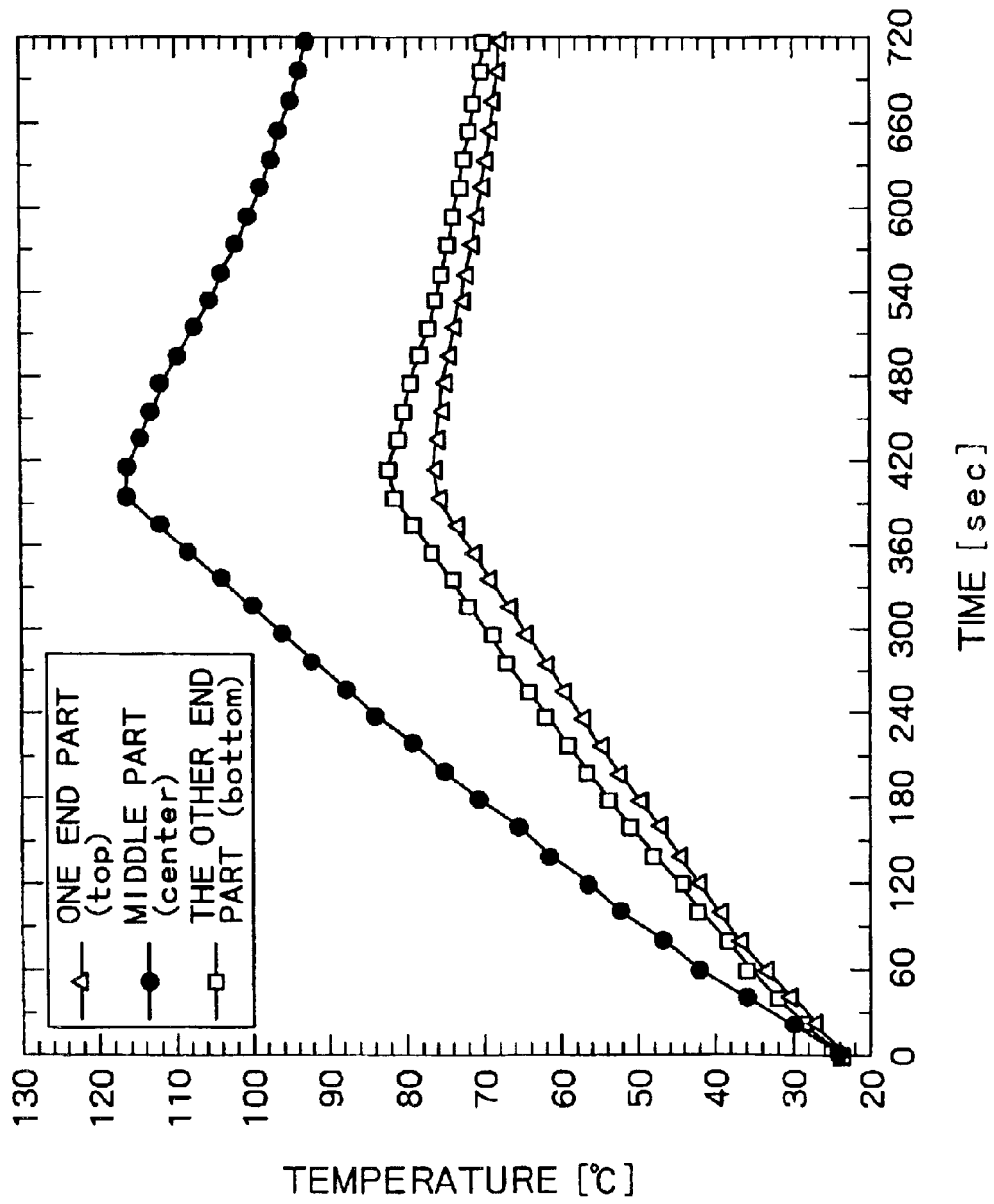

B - B

B - B

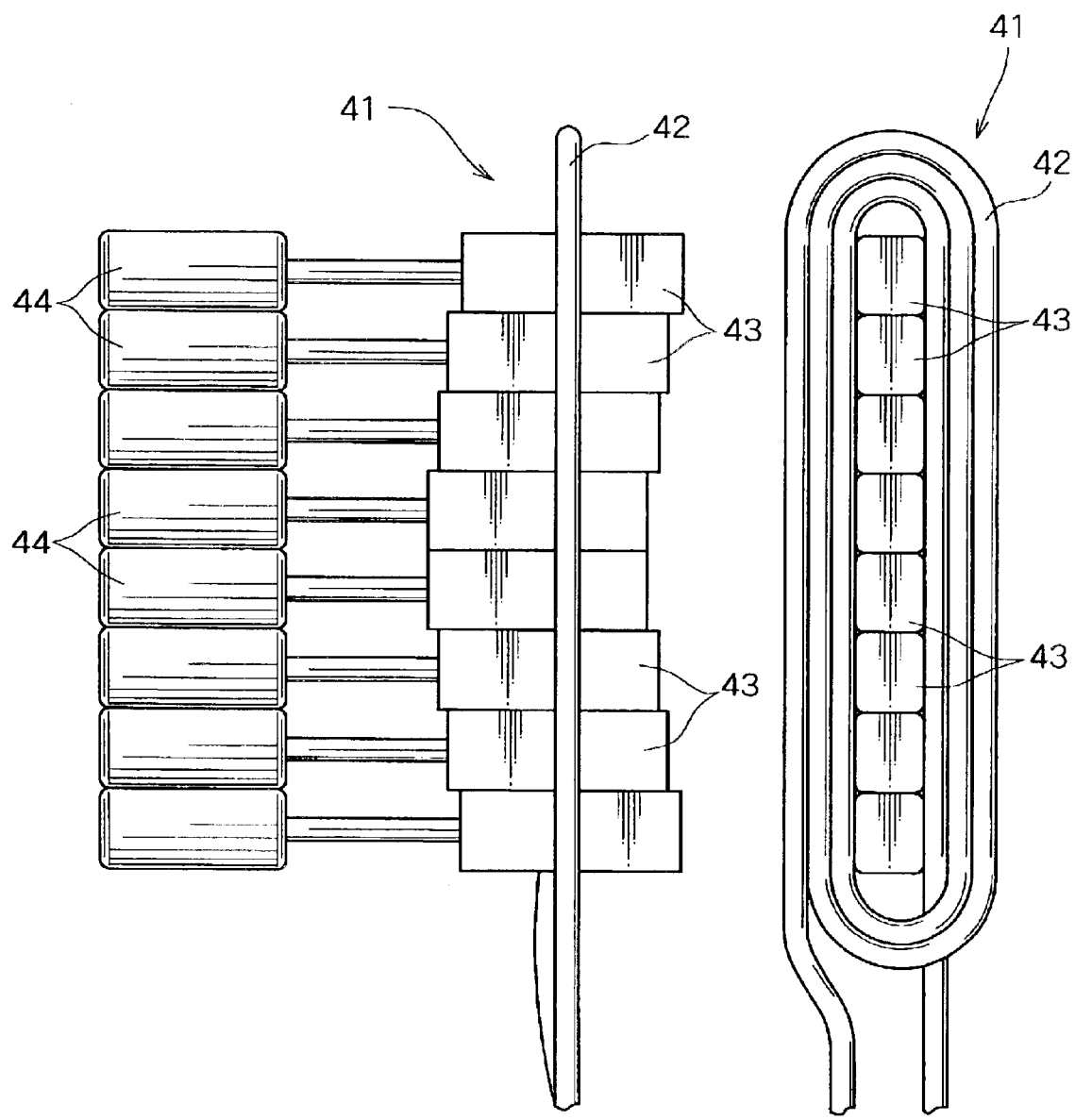

FIG. 17A
FIG. 17B
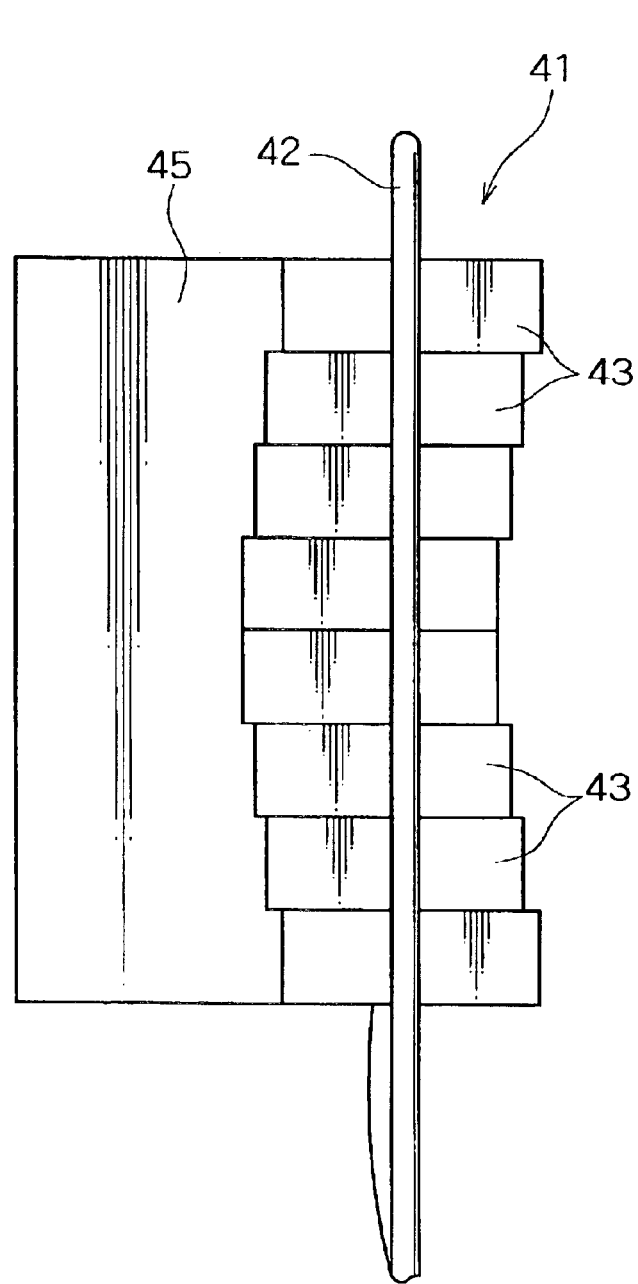
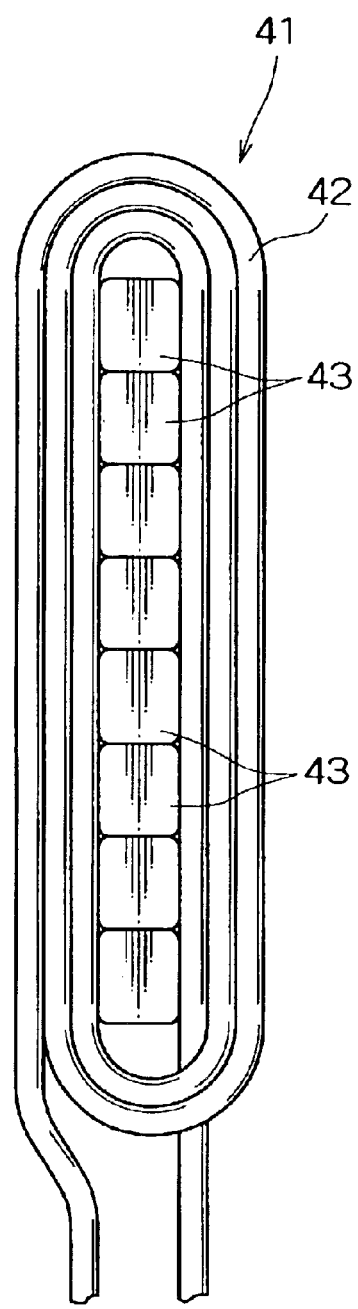

FIG. 18A
FIG. 18B
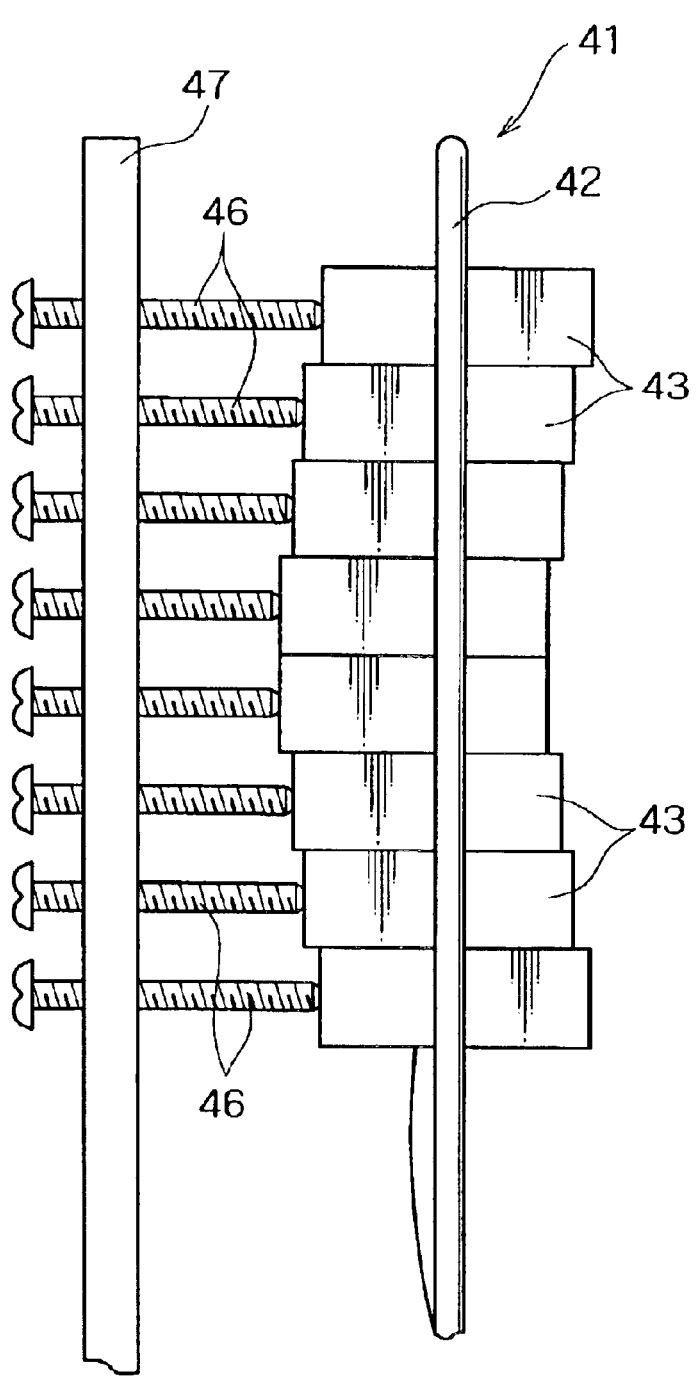
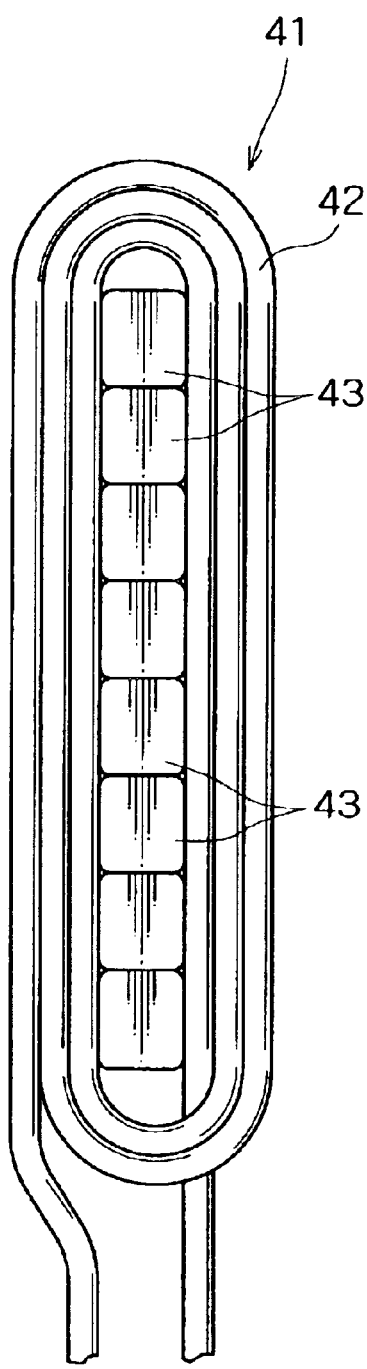

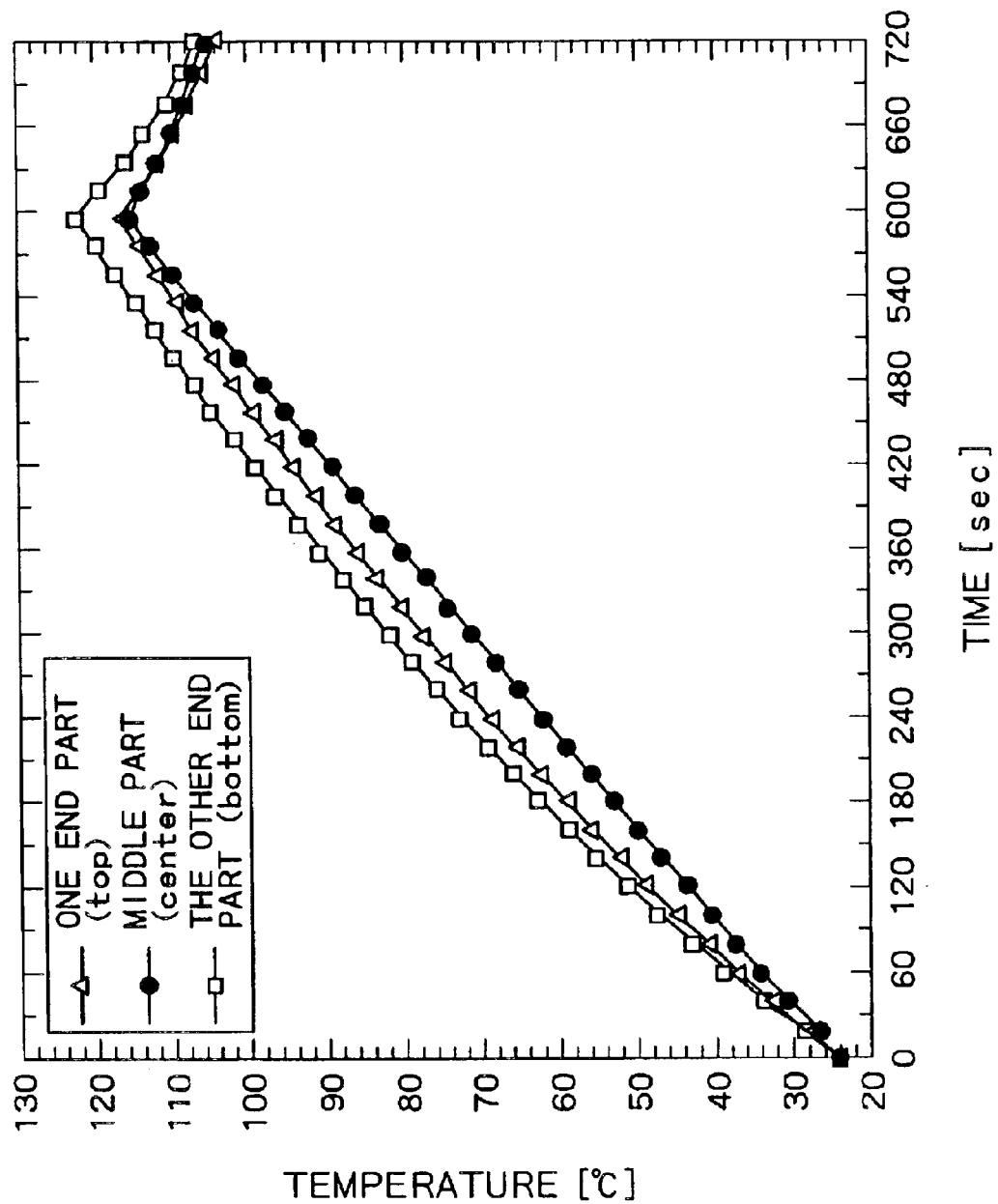

RAW TIRE PREHEATING METHOD AND APPARATUS THEREFOR

FIELD OF THE INVENTION

The present invention relates to a method for preheating a raw tire before vulcanizing/molding the raw, and to an apparatus for performing the method.

BACKGROUND OF THE INVENTION

Traditionally, raw tires formed by a molding machine are stored at room temperature on racks in a stockroom, with which a building or the like for a vulcanization installation is equipped. Thereafter, the raw tires thus stored are transported from the racks to a vulcanization machine in accordance with a predetermined production program. In the vulcanization machine, the raw tries are heated up at a vulcanization temperature, and then the vulcanization/molding of the tires is carried out. In this case, when the raw tires are stored at room temperature for a long time, the tires are cooled at a much lower temperature than the vulcanization starting temperature, for instance, at such a low temperature as 25° C. Accordingly, a longer time is normally required to completely vulcanize the raw tire after heating it at a temperature greater than the vulcanization starting temperature. In view of this fact, several methods for storing the raw tires are conventionally employed or envisaged: In one method, raw tires are stored in a stockroom, the environment of which is maintained at a preheating temperature near the vulcanization starting temperature; and in the other method, the raw tires are directly preheated by irradiating them with a microwave.

In the conventional method for preheating the raw tires by conditioning the stockroom at the preheating temperature, it is necessary to heat the overall stockroom at such a preheating temperature and to maintain it at the temperature. Furthermore, the preheating (heating) is carried out exclusively on the front surface side of the raw tires, whereas the heating is delayed in the inside, so that a sufficient preheating can be attained in the process of the vulcanization/molding. These facts may provide a possible problem in which the running cost is significantly increased.

In the method for irradiating the raw tire with a microwave, the overall raw tire is exposed to the microwave, so that it is difficult to uniformly preheat the raw tire in the direction of the tire width, when the raw tire has a complicated shape, varied thickness and complicated inner structure.

Accordingly, it is an object of the present invention to provide a method and an apparatus for preheating a raw tire, in which the preheating can be carried out uniformly over the entire tire at a decreased running cost.

SUMMARY OF THE INVENTION

In accordance with a first aspect of the invention, a raw tire-preheating apparatus is provided for preheating a raw tire by the induction heating of metallic elements embedded in the inside of the raw tire, wherein the apparatus comprises coil means disposed to face the raw tire for generating a high frequency magnetic field to apply it to the raw tire: and core means made of a ferromagnetic material having a low electrical conductivity for providing the intensity distribution of the high frequency magnetic field to uniformly preheat the overall area of the raw tire.

In the first aspect of the invention, the metallic elements embedded in the raw tire is heated through the induction heating by the high frequency magnetic field generated from coil means, so that the raw tire is preheated from the inside of the raw tire. Since, therefore, there is no such requirement of heating the entire stockroom and to maintain it at the preheating temperature as in the conventional installation, the running cost in the preheating can be significantly reduced. Moreover, the core means absorbs the magnetic field and is capable of providing an arbitrary field distribution by the ferromagnetic material having a low electrical conductivity, the entire raw tire can be preheated overall at substantially the same temperature or a desired temperature distribution even if the raw tire has a complicated shape, varied thickness and complicated inner structure.

In accordance with a second aspect of the invention, a raw tire-preheating apparatus is provided for preheating the raw tire by the induction heating of metallic elements embedded in the inside of the raw tire, wherein the apparatus comprises a tread section-preheating mechanism including a front coil disposed to face the tread section for generating a high frequency magnetic field to apply it to the tread section; and a core mechanism made of a ferromagnetic material having a low electrical conductivity to absorb the high frequency magnetic field, such that the tread section is preheated uniformly overall in the tire width direction; and a movement mechanism for moving at least one of the tread section-preheating mechanism and the raw tire such that the tread section-preheating mechanism is move along the tread section.

In accordance with a third aspect of the invention, a raw tire-preheating apparatus is provided for preheating a raw tire by the induction heating of metallic elements embedded in the inside of the raw tire, wherein the apparatus comprises a tread section-preheating mechanism including a front coil disposed to face the tread section for generating a high frequency magnetic field to apply it to the tread section; and a core mechanism made of a ferromagnetic material having a low electrical conductivity; and a movement mechanism for moving at least one of the tread section-preheating mechanism and the raw tire such that the tread section-preheating mechanism is moved along the tread section.

In the second and third aspects of the invention, the metallic elements embedded in the raw tire is heated through the induction heating by the high frequency magnetic field generated from coil means, so that the raw tire is preheated from the inside of the raw tire. Since, therefore, there is no such requirement of heating the entire stockroom and to maintain it at the preheating temperature as in the conventional installation, the running cost in the preheating can be significantly reduced. Moreover, the core mechanism absorbs the magnetic field and is capable of providing an arbitrary field distribution by the ferromagnetic material having a low electrical conductivity, the entire raw tire can be preheated overall at substantially the same temperature or a desired temperature distribution even if the tread section has a complicated shape, varied thickness and complicated inner structure.

In accordance with the fourth aspect of the invention, the core mechanism includes a shield core interposed between the tread section and the front coil to face the inside part of the tread section.

In the fourth aspect of the invention, the shield core is disposed to face the inner part of the tread section shields the high frequency magnetic field generated from the front coil, so that the outer part of the tread section is heated more effectively than the inner part. As a result, a desired field distribution of the high frequency magnetic field can be attained with ease by the shield core.

In accordance with a fifth aspect of the invention, the front coil is disposed such that the opening thereof faces the tread section, and the core mechanism includes a shield core interposed between the tread section and the front coil to face the inside part of the tread section; and center cores disposed in the opening such that the front-end surfaces thereof are positioned close to the outside part of the tread section.

In the fifth aspect of the invention, the shield core is disposed to face the inner part of the tread section shields the high frequency magnetic field generated from the front coil. Furthermore, the center cores absorb the high frequency magnetic field to concentrate it on the front-end surface, thereby making it possible to apply the magnetic field having high intensity to the outer part of the tread section from a closer position. As a result, the outer part of the tread section is heated by the induction heating more effectively than the inner part.

In accordance with a sixth aspect of the invention, the core mechanism includes a side core on both side surfaces of the front coil such that the front-end surfaces thereof are positioned close to the outside part of the tread section.

In the sixth aspect of the invention, the side cores and center cores are disposed in parallel, and further absorb the high frequency magnetic field from the front coil to concentrate it on the front-end surface, thereby making it possible to apply the magnetic field having a high density to the outer part of the tread section from a closer position. As a result, the outer part of the tread section is heated by the induction heating more effectively than the inner part.

In accordance with a seventh aspect of the invention, the front coil is disposed such that opening thereof faces the tread section, and the core mechanism has core blocks, whose front-end surfaces are gradually closer to the tread section from the inside part to the outside part in the opening.

In the seventh aspect of the invention, the core blocks absorb the high frequency magnetic field from the front coil to concentrate it on the front-end surface. Consequently, the outer part of the tread section, which is close to the front-end surface, is heated by the induction heating more effectively than the inner part.

In accordance with an eighth aspect of the invention, a raw tire-preheating apparatus is provided for preheating a raw tire by the induction heating of metallic elements embedded in the inside of the raw tire, wherein the apparatus comprises a tread section-preheating mechanism including a front coil disposed such that the opening thereof faces the tread section for generating a high frequency magnetic field to apply it the tread section; a rear coil disposed on the rear side of the front coil to generate a high frequency magnetic field in the reversed direction with respect to the high frequency magnetic field generated from the front coil; and separation cores made of a ferromagnetic material having a low electrical conductivity for absorbing the high frequency magnetic field, the separation cores being disposed in a position corresponding to the outside part of said tread section between said front coil and the rear coil; and a movement mechanism for moving at least one of said tread section-preheating mechanism and the raw tire such that the tread section-preheating mechanism is moved along the tread section.

In accordance with a ninth aspect of the invention, a raw tire-preheating apparatus is provided for preheating a raw tire by the induction heating of metallic elements embedded in the inside of the raw tire, wherein the apparatus comprises a tread section-preheating mechanism including a front coil disposed such that the opening thereof faces the tread section for generating a high frequency magnetic field to apply it the tread section; a rear coil disposed on the rear side of the front coil to generate a high frequency magnetic field in the reversed direction with respect to the high frequency magnetic field generated from the front coil; and separation cores made of a ferromagnetic material having a low electrical conductivity, the separation cores being disposed in a position corresponding to the outside part of the tread section between the front coil and the rear coil; and a movement mechanism for moving at least one of the tread section-preheating mechanism and the raw tire such that the tread section-preheating mechanism is moved along the tread section.

In the eighth and ninth aspects of the invention, the metallic elements embedded in the tread section of the raw tire is heated through the induction heating by the high frequency magnetic field generated from the front coil, so that the tread section is heated from the inside. Since, therefore, there is no such requirement of heating the entire stockroom and to maintain it at the preheating temperature as in the conventional installation, the running cost in the preheating can be significantly reduced. Moreover, the high frequency magnetic field generated from the front coil acts to cancel the magnetic field generated from the rear coil disposed on the rear side of the front coil. As a result, in the inner part of the tread section where no separation core is disposed, the high frequency magnetic field from the front coil is hardly applied thereto. On the other hand, in the outer part of the tread section where the separation core is disposed, the high frequency magnetic field is applied thereto more effectively because the separation core acts as a shield plate for the high frequency magnetic field from the front coil. Hence, the outer part of the tread section is heated by the induction heating more effectively than the inner part, thereby enabling the entire tread section to be uniformly preheated, even if the outer part of the tread section is thicker than the inner part.

In accordance with a tenth aspect of the invention, the tread section-preheating mechanism has center cores whose front-end surfaces are positioned close to the outside part of the tread section in the opening.

In the tenth aspect of the invention, the center cores absorb the high frequency magnetic field from the front coil to concentrate it on the front-end surface, so that the magnetic field having high intensity may be applied to the outer part of the tread section from a closer position. As a result, the outer part of the tread section may be heated by the induction heating more effectively than the inner part.

In accordance with an eleventh aspect of the invention, the tread section-preheating mechanism has side cores disposed on both side surfaces of the front coil, such that the front-end surfaces of the side cores are positioned close to the outside part of the tread section.

In the eleventh aspect of the invention, the side cores and center cores are disposed in parallel and absorb the high frequency magnetic field to concentrate it on the front-end surface, so that the magnetic field having a high intensity is applied to the outer part of the tread section from a closer position. As a result, the outer part of the tread section can be heated by the induction heating more effectively than the inner part.

In accordance with a twelfth aspect of the invention, a plurality of the tread section-preheating mechanisms is disposed along the tread section.

In the twelfth aspect of the invention, the tread section may be preheated substantially uniformly by utilizing these tread section-preheating mechanism.

In accordance with a thirteenth aspect of the invention, a raw tire-preheating method is provided for preheating a raw tire through the induction heating by applying a high frequency magnetic field to metallic elements embedded in the inside of the raw tire, wherein core means made of a ferromagnetic material having a low electrical conductivity for absorbing the high frequency magnetic field are disposed along the raw tire 4 to provide such an intensity distribution of the high frequency magnetic field that the raw tire is preheated uniformly overall.

In the thirteenth aspect of the invention, the metallic elements embedded in the raw tire is heated through the induction heating by the high frequency magnetic field generated by coil means, so that the raw tire is preheated from the inside. Since, therefore, there is no such requirement of heating the entire stockroom and to maintain it at the preheating temperature as in the conventional installation, the running cost in the preheating can be significantly reduced. Moreover, the core means absorbs the high frequency magnetic field with the aid of the ferromagnetic material having a low electrical conductivity to provide an arbitrary field distribution, thereby making it possible to preheat the entire raw tire uniformly.

In accordance with a fourteenth aspect of the invention, a raw tire-preheating apparatus is provided for preheating a raw tire by the induction heating of metallic elements embedded in the inside of the raw tire, wherein the apparatus comprises coil means disposed to face the raw tire for generating a high frequency magnetic field and for applying it to the raw tire; and core means made of a ferromagnetic material having a low electrical conductivity, whereby more than two sets of said coil means and said core means are disposed in the width direction of the raw tire.

In fourteenth aspect of the invention, the raw tire may be preheated by the induction heating with a high frequency power supply having a relatively small capacity by utilizing more than two coil means. Moreover, more than two sets of coil means and core means allow the distribution of the received heat in the direction of the raw tire width to be controlled, thereby making it possible to adjust with ease the temperature profile in the direction of the raw tire width.

In accordance with a fifteenth aspect of the invention, more than two sets of said coil means and said core means disposed in the width direction of the raw tire are positioned in a shifted position different from each other.

In the fifteenth aspect of the invention, more than two sets of coil means and core means can be arranged without overlap in the tire width direction.

BRIEF DESCRIPTION OF THE DRAWINGS

FIG. 7 is a drawing showing a high frequency magnetic field viewed from line A in FIG. 3;

FIG. 8 is a cutaway drawing of a raw tire in perspective view;

FIG. 9 is a diagram showing the temperature variation in the induction heating of a raw tire;

FIG. 10 is a diagram showing the temperature variation in induction heating of a raw tire;

FIG. 16 is drawings showing the arrangement of the tread section-preheating mechanism: (a) front view; and (b) side view;

FIG. 17 is drawings showing the arrangement of another tread section-preheating mechanism: (a) front view; and (b) side view;

FIG. 18 is drawings showing the arrangement of another tread section-preheating mechanism: (a) front view; and (b) side view;

FIG. 30 is a diagram showing the temperature variation in the induction heating of a raw tire.

BEST MODE FOR CARRYING OUT THE INVENTION

[Embodiment 1]

Figure 1:
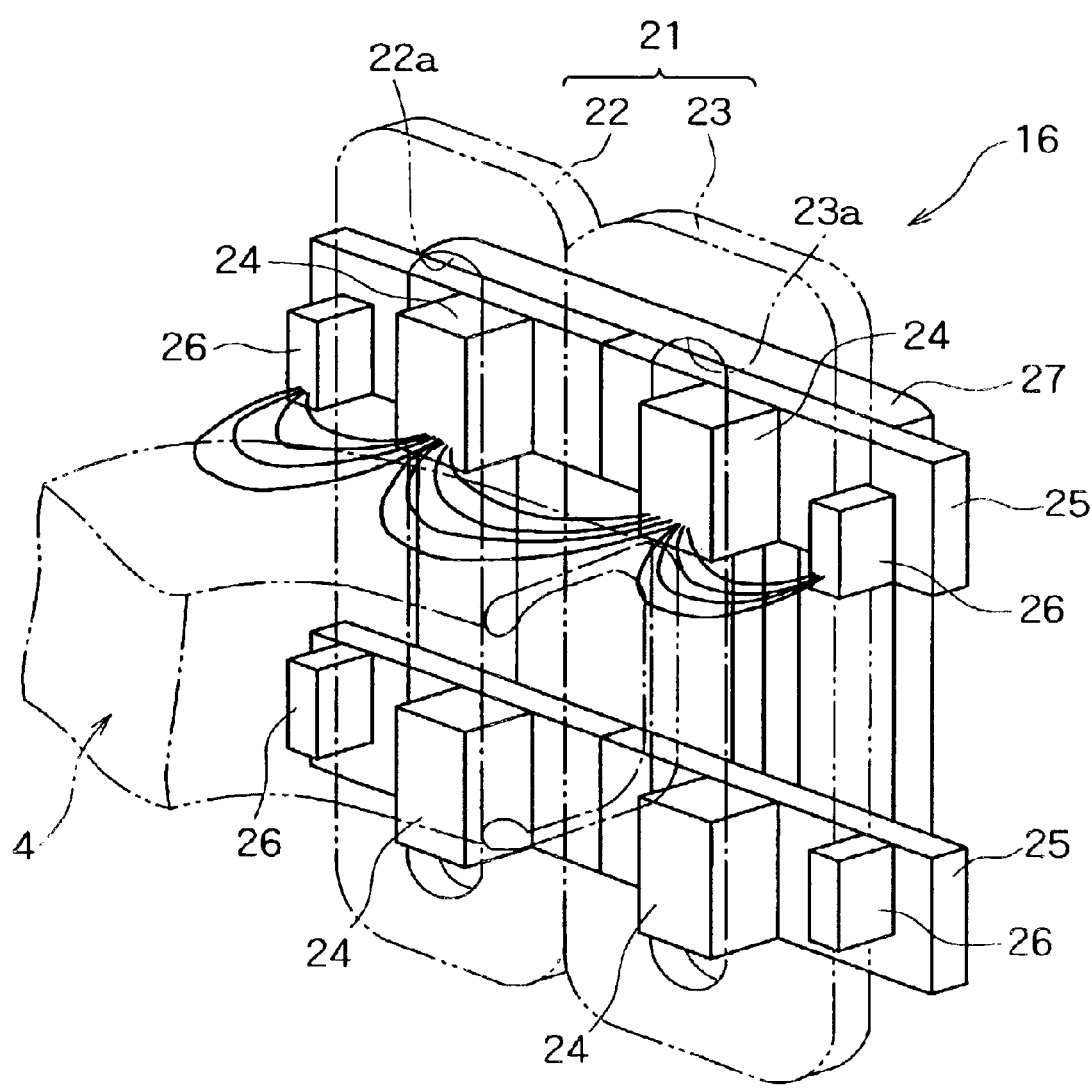
FIG. 1 is a perspective view of a tread section-preheating mechanism.

Referring now to FIGS. 1 to 10, a first embodiment of the present invention will be described. A raw tire-preheating apparatus 1 according to the first embodiment is used in a storage process. The storage process is interposed between a molding process for forming the raw tire 4 and a vulcanization process for vulcanizing the raw tire 4.

As shown in FIG. 8, the above-mentioned raw tire 4 comprises a carcass assembly 51 having curved parts at both ends; metallic bead wires 52 disposed in the curved parts of the carcass assembly 51; a gummy inner liner 53 adhered to the inside surface of the carcass assembly 51; a gummy tread element 54 and gummy side wall elements 55 adhered respectively to the outer surface and the side surface of the carcass assembly 51; and a metallic belt element 56 interposed between the tread element 54 and the carcass assembly 51. The tire structure includes metallic elements (bead wires 52 and belt element 56) both in a tread section 4a having a greater thickness and in bead sections 4c and 4c'. The present invention is not limited to the raw tire 4 having the above-mentioned structure. For instance, metallic elements, such as belt element 56 and the like, can be disposed in a restricted area of the raw tire 4.

Figure 2A:
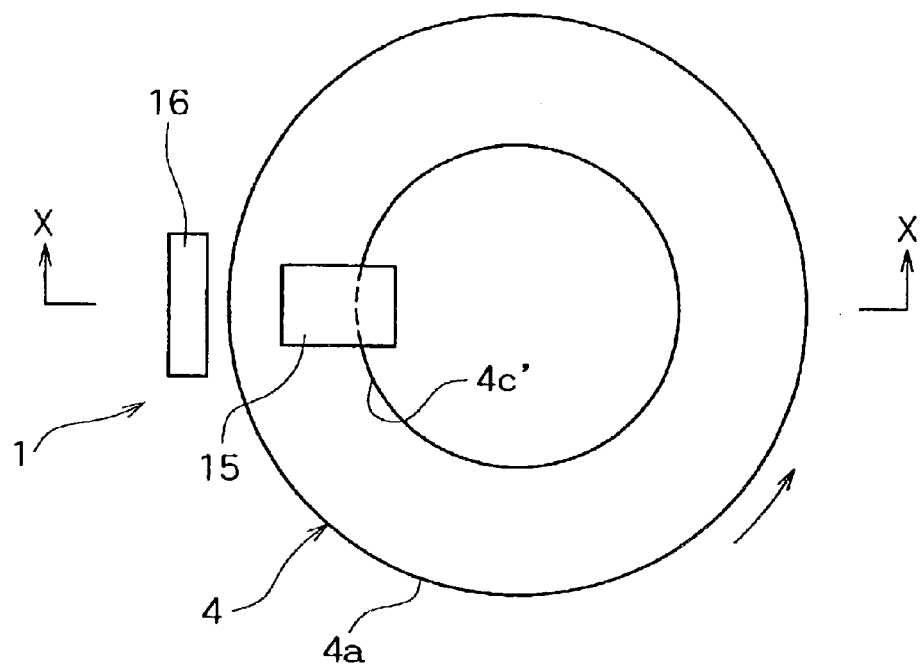
FIG. 2 is drawings for explaining the preheating process in a raw tire-preheating apparatus: (a) in plan view, and (b) in front view.
Figure 2B:
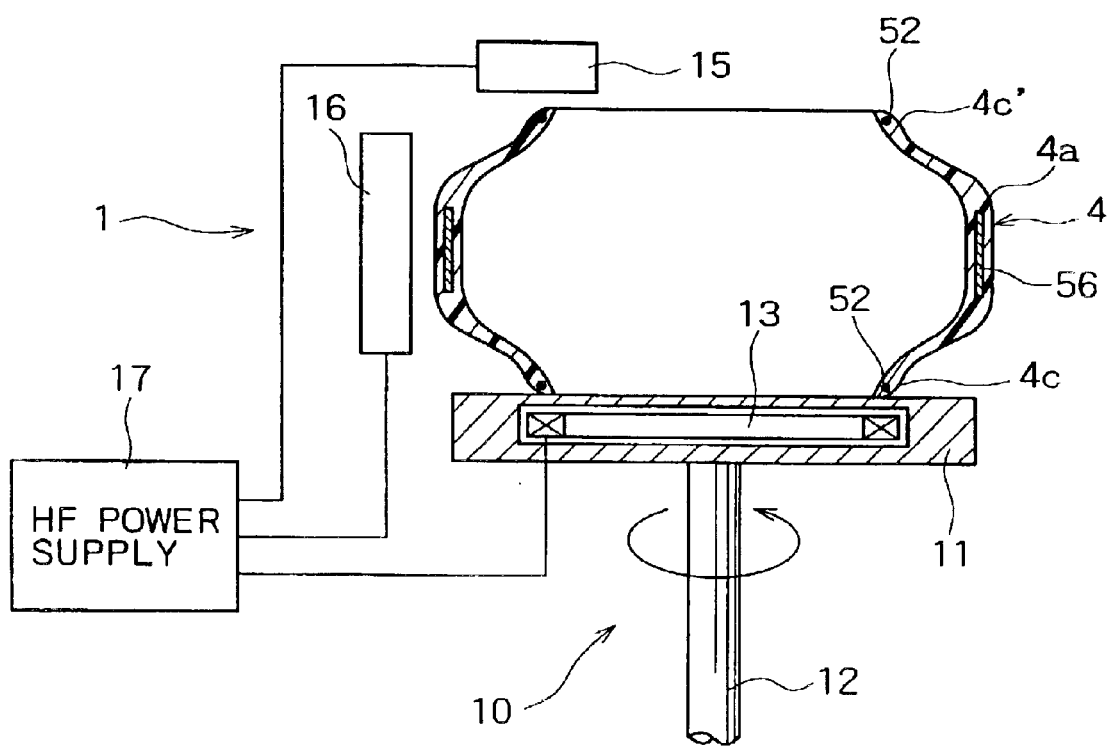

In the storing process for storing the raw tire 4 having the above-mentioned structure, a depository of a storing apparatus (not shown) is employed. The depository includes a plurality of storing sections for storing the raw tire 4 by supporting it with a support mechanism 10, as shown in FIGS. 2(a) and 2(b). Each storing section is equipped with a raw tire preheating apparatus 1. The raw tire preheating apparatus 1 includes a turntable 11 on which the raw tire 4 is placed, and a rotation driving mechanism (not shown) is coupled to the center of the lower part of the turntable 11 via a rotary shaft 12. The rotation driving mechanism serves to rotate the raw tire 4 in the horizontal direction along with the turntable 11, when storing the raw tire 4.

A lower bead section-preheating coil 13 is disposed in the inside of the turntable 11. The lower bead section-preheating coil 13 is arranged in such a way that it faces the lower bead section 4c. Furthermore, an upper bead section-preheating mechanism 15 including a coil is disposed above the turntable 11. The upper bead section-preheating mechanism 15 is disposed just above the upper bead section 4c' in such a way that it faces part of the upper bead sections 4c'. Moreover, a tread section-preheating mechanism 16 is disposed at an upper side area of the turntable 11 in such a way that it faces part of the tread section 4a of the raw tire 4.

The lower bead section-preheating coil 13, the upper bead section-preheating mechanism 15 and the tread section-preheating mechanism 16 are connected to a high frequency power supply 17. A high frequency power is supplied from the high frequency power supply 17 to the lower bead section-preheating coil 13 in order to provide the induction heating exclusively to the lower bead section 4c by applying a high frequency magnetic field having strong intensity to the bead wire wires 52 (metallic elements) in the lower bead sections 4c. Furthermore, a high frequency power is supplied from the high frequency power supply 17 to the upper bead section-preheating mechanism 15 in order to provide the induction heating exclusively to the upper bead section 4c' by applying a high frequency magnetic field having strong intensity to the bead wire wires 52 (metallic elements) in the upper bead sections 4c'. Similarly, a high frequency power is supplied from the high frequency power supply 17 to the tread section-preheating mechanism 16 in order to provide the induction heating exclusively to the tread section 4a by applying a high frequency magnetic field having strong intensity to the belt element 56 (metallic elements) in the tread section 4a.

Figure 3:
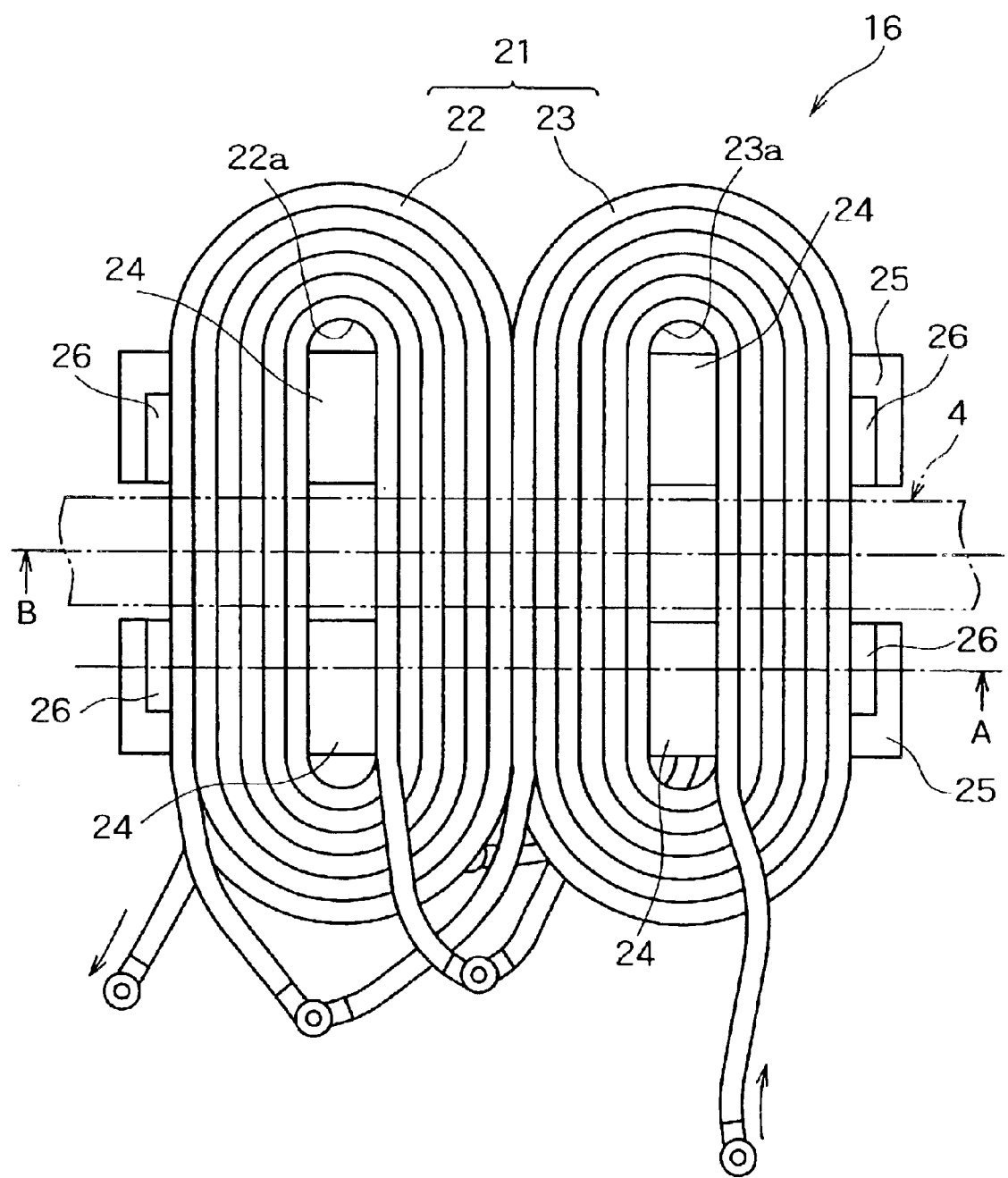
FIG. 3 is a front view of the tread section-preheating mechanism.

The tread section-preheating mechanism 16 is equipped with a front coil 21, which is disposed so as to face the tread section 4a in the raw tire 4, as shown in FIG. 1. The front coil 21 comprises a left front coil section 22 and a right front section 23 in a symmetric arrangement, as is also shown in FIG. 3. The left front coil section 22 and the right front section 23 are disposed in a V shape so as to face the curved shape of the tread section 4a of the raw tire 4 by placing the left and right sides of the front coils sections 22 and 23 at positions closer to the tread section 4a than the portions at which the both front coil sections 22 and 23 are coupled to each other.

Each of the front coil sections 22 and 23 is formed in an annular form of an ellipse by winding a wire in the reverse direction to each other. Moreover, each of the front coil sections 22 and 23 is aligned such in such a manner that its apsidal direction coincides with the tire width direction, in which case, the front coil sections 22 and 23 are formed in such a manner that the inner openings 22a and 23a thereof have sufficiently a greater size in the apsidal direction than the tire width of the raw tire 4.

A pair of upper and lower center cores 24/24 made of a ferromagnetic material having a low electrical conductivity is disposed inside the openings 22a and 23a of each front coil section 22 or 23 in order to absorb the magnetic field. In this case, a ferrite core or laminated silicon steel can be employed as such a ferromagnetic material having a low electrical conductivity. Each of the center cores 24/24 is formed such that the upper surface thereof is positioned closer to the side of the raw tire 4 than to the front coil 21, and further close to the outer part (shoulder part) of the tread of the raw tire 4. As a result, the center cores 24 are arranged around the raw tire 4 in the front coil 21.

Figure 6:
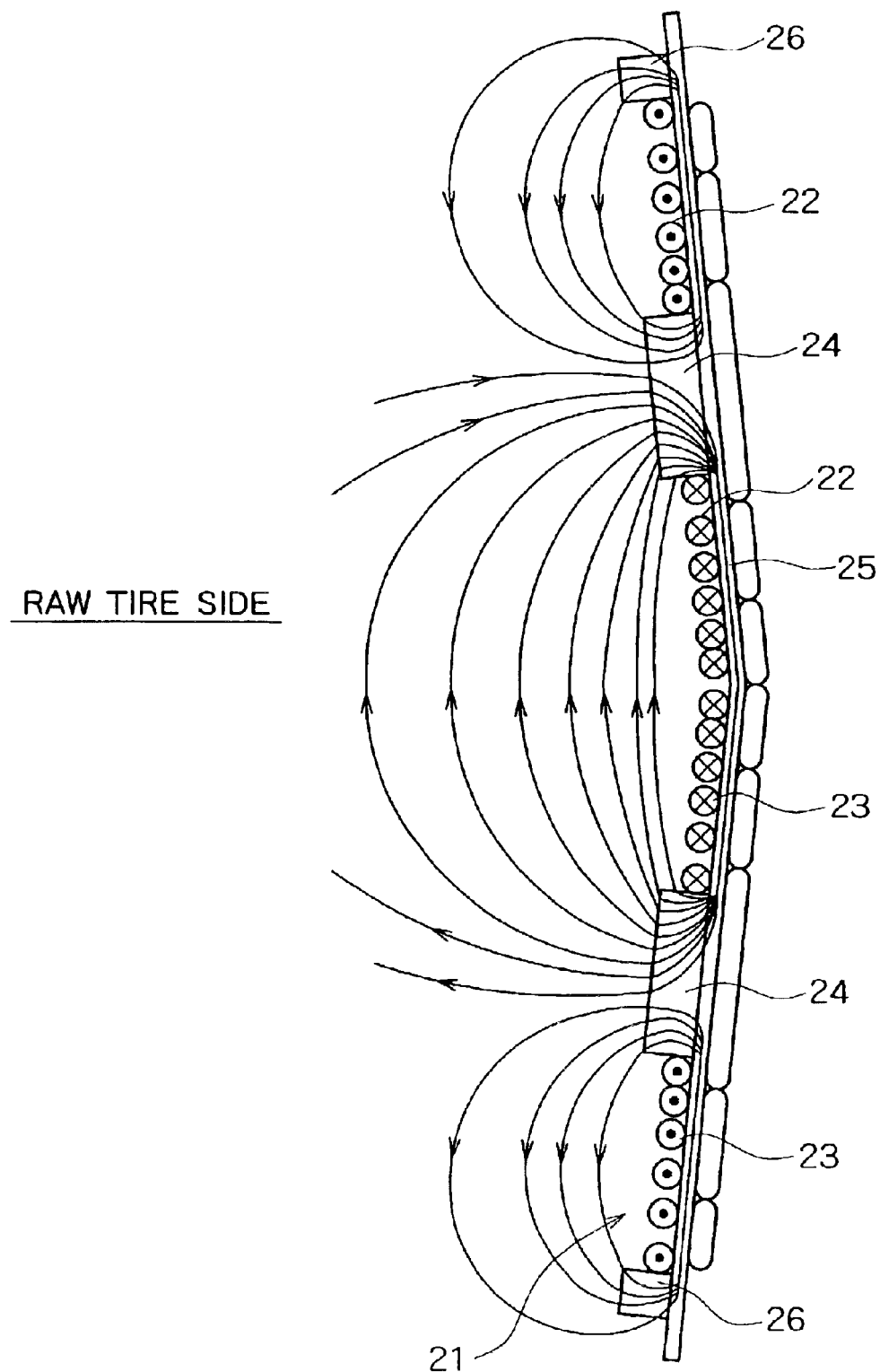
FIG. 6 is a drawing showing a high frequency magnetic field viewed from line B in FIG. 3.

Each center core 24/24 is disposed in a separation core 25/25 made of a ferromagnetic material having a low electrical conductivity. The separation cores 25 are disposed as a pair of upper and lower elements with horizontal direction on the rear side of the front coil 21. As shown in FIG. 6, the separation cores 25 are arranged in a V shape so as to face both the left front coil section 22 and the right front coil section 23, and in such a manner that the ends of the separation cores are positioned on the outer side of the front coil 21. As shown in FIG. 1, a side core 26/26 made of a ferromagnetic material having a low electrical conductivity is disposed at each end of the separation core 25, in which case, each side core 26 is disposed in such a manner that the upper surface thereof is closer to the side of the raw tire 4 than to the front coil 21. As a result, the upper and lower parts of the front coil 21 is clamped by the side cores 26/26 and the center cores 24/24, which are coupled to each other via the separation cores 25, thereby enabling lines of magnetic force to be concentrated on the cores 26/26 and 24/24, as shown in FIG. 6, and therefore the outer part (shoulder part) of the tread section to be preferably heated than the inner part by induction heating.

Figure 4:
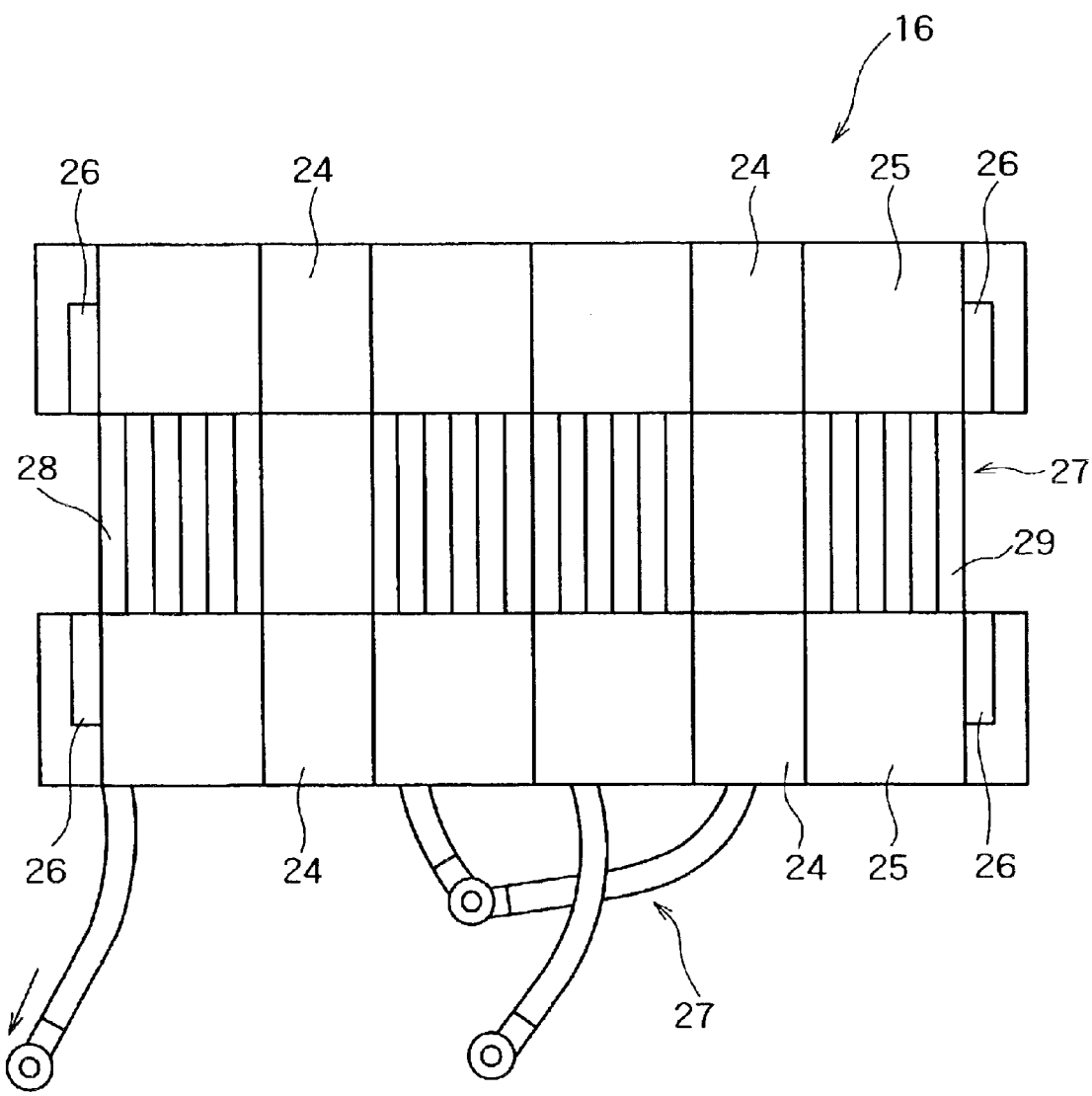
FIG. 4 is a partial front view of the tread section-preheating mechanism.
Figure 5:
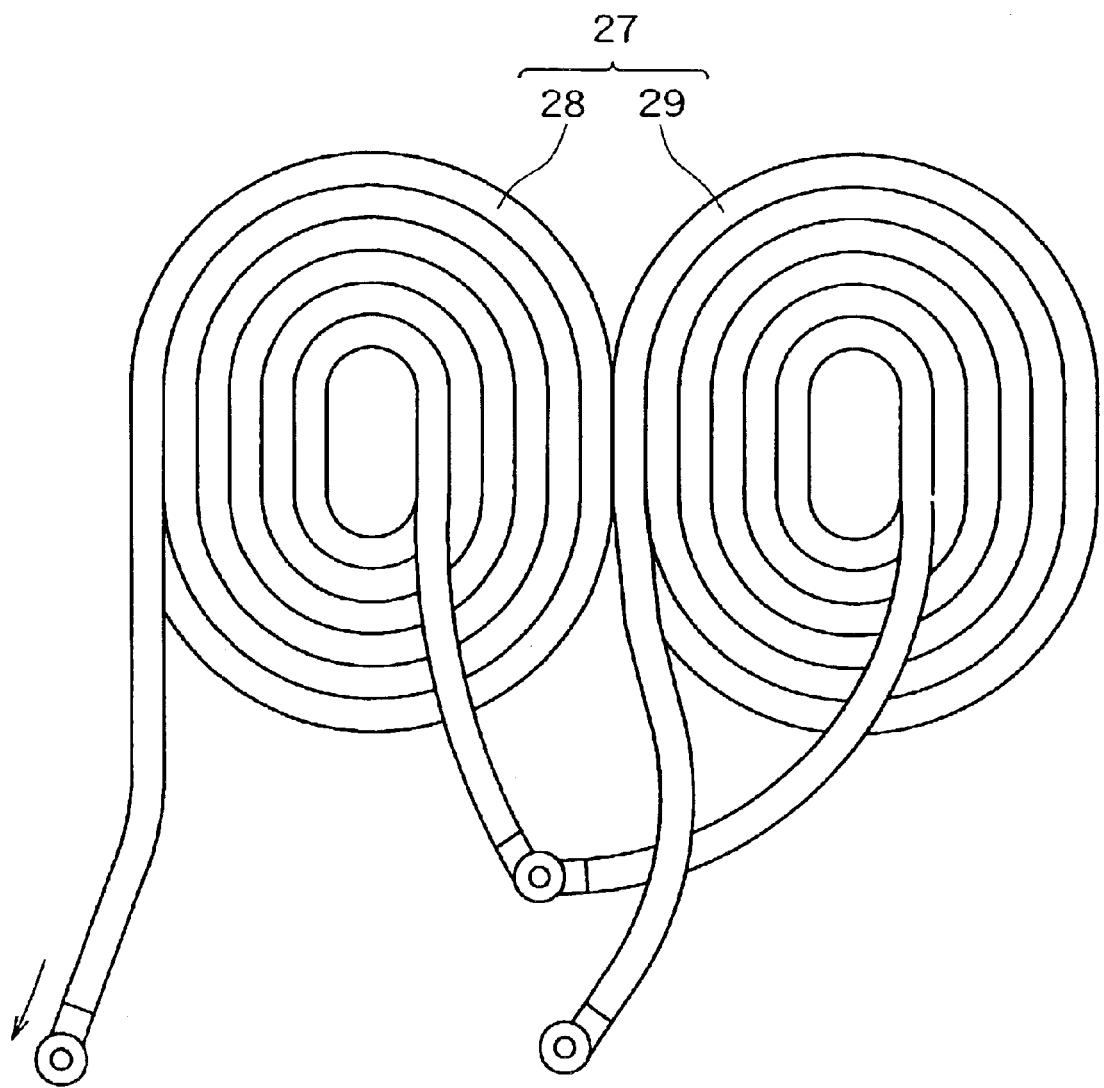
FIG. 5 is a front view of a rear coil.

A rear coil 27 is disposed on the rear side of the separation core 25, as shown in FIG. 4. In this case, the upper and lower parts of the rear coil 27 are covered by the separation core 25. As shown in FIG. 5, the rear coil 27 comprises a left rear coil section 28 and a right rear coil section 29. The left rear coil section 28 and the right rear coil section 29 face the left front coil section 22 and the right front coil section 23 of the front coil 21, respectively. The rear coil sections 28 and 29 are arranged in an annular form of an ellipse by winding a wire in a winding sense opposite to that of the facing front coils sections 22 and 23. In this arrangement, the magnetic force resulting from the rear coil 27 is cancelled by the magnet force resulting from the front coil 21, and therefore, no substantial magnetic fields are generated between the separation cores 25/25 of the front coil 21, as shown in FIG. 7.

The method for preheating the raw tire will be described, based on the function of the raw tire-preheating apparatus in the above-mentioned arrangement.

In the molding process, a raw tire 4 consisting of a plurality of layers is formed by a tire-molding machine, where the belt element 56 and the bead wires 52 are included between these layers, as shown in FIG. 8. Thereafter, the raw tire 4 is removed from the tire-molding machine. If the vulcanization of the raw tire is carried out after expiring a predetermined duration, the raw tire 4 is transferred to the storing process where the raw tire is stored in the raw tire-preheating apparatus 1, while maintaining the state of preheating, as shown in FIG. 2.

In other words, the raw tire 4 is transferred to the storing process, so that the raw tire 4 is placed on the turntable 11 of the raw tire-preheating apparatus 1. Thereafter, the rotation driving mechanism (not shown) is driven and then the raw tire 4 is rotated along with the turntable 11 via the rotary shaft 12. In this state, a high frequency power is supplied to the lower bead section-preheating coil 13, the upper bead section-preheating mechanism 15 and the tread section-preheating mechanism 16 from the high frequency power supply 17.

In the lower bead section-preheating coil 13, the supply of the high frequency power causes the bead wires 52 in the lower bead section 4c to be heated in the induction heating by applying a high frequency magnetic field having strong intensity to the lower bead section 4c of the raw tire 4. On the other hand, in the upper bead section-preheating mechanism 15, the supply of the high frequency power causes the bead wires 52 in the upper bead section 4c' to be heated in the induction heating by applying a high frequency magnetic field having strong intensity to the upper bead section 4c' of the raw tire 4. As a result, the bead sections 4c and 4c' having a greater thickness are heated from the inside of the raw tire 4, so that no temperature decrease occurs in the bead sections 4c and 4c'. The temperature may be risen up to the vulcanization temperature in accordance with the magnitude of the applied high frequency magnetic field.

In the tread section-preheating mechanism 16, the front coil 21 and the rear coil 27 generate a high frequency magnetic field, as shown in FIG. 1. In this case, the center cores 24 and side cores 26 connected to each other via the corresponding separation cores 25 are disposed in the upper and lower parts of the front coil 21, respectively. The cores 24, 25 and 26 are made of a ferromagnetic material having a low electrical conductivity, thereby serving to absorb the magnetic force. Consequently, the high frequency magnetic field generated from the front coil 21 is concentrated on the center core 24 and the side core 26 after passing through the separation core 25, and further occurs on the front side, i.e., the side on which the raw tire 4 is placed, as is also shown in FIG. 6. In this case, it is noted that the magnetic field generated from the rear coil 27 is shield by the separation core 25 and therefore provides no influence on the magnetic field resulting from the front coil 21. It is further noted that the upper and lower parts of the front coil 21 in which the cores 24, 25 and 26 are disposed are located near the ends of the raw tire 4 in the tire width direction, i.e., near the ends of the tread section 4a. As a result, the high frequency magnetic fields generated from the upper and lower parts of the front coil 21 are concentrated on the end parts (shoulder parts) of the tread section 4a of the raw tire 4 with a high field strength, thereby making it possible to induction-heat exclusively the end parts.

On the other hand, in the middle part of the raw tire preheating apparatus 1 between the separation cores 25/25, the rear coil 27 faces the front coil 21 and the sense of winding in the front coil 21 is opposite to that in the rear coil 27. It follows that the high frequency magnetic field generated from the front coil 21 substantially cancels the high frequency magnetic field generated from the rear coil section 28 and therefore the high frequency magnetic field generated in the middle part of the front coil 21 mostly disappears, as shown in FIG. 7. As a result, the inner part of the tread section 4a in the raw tire 4 facing the middle part of the front coil 21 is heated with a relatively small field strength through the induction heating by the high frequency magnetic field resulting from the cores 24, 25 and 26, which are disposed on the upper and lower parts of the front coil 21. Under these conditions, a specific heat distribution can be obtained through the induction heating by increasing the field strength from the inner part to the outer part (shoulder part) of the tread section 4a, and the heat distribution allows the overall parts of the tread section 4a to be preheated almost uniformly, even if the thickness of the tread section 4a increases from the inside to the outside (shoulder part) thereof.

In the preheating of the raw tire 4, moreover, the rotation of the raw tire 4 causes the raw tire 4 to be moved relative to both the upper bead section-preheating mechanism 15 and the tread section-preheating mechanism 16. Accordingly, the induction heating can uniformly be carried out by uniformly applying the high frequency magnetic field to the overall circumference of the raw tire 4, even if the preheating mechanisms 15 and 16 are mounted in less mounting precision and/or in less machining precision, thereby enabling the high frequency magnetic field not to be uniformly applied to the tread section 4a and the upper bead section 4c' in the raw tire 4. Hence, the works of mounting and the machining can be made with ease, since no high precision is required in mounting and machining the preheating mechanisms 15 and 16.

The thermal properties as for the temperature rise at the end parts ("top" and "bottom") and the middle part ("center") of the tread section 4a were investigated, when the tread section 4a is actually induction-heated with the tread section-preheating mechanism 16. For the sake of comparison, the thermal properties as for the temperature rise at the end parts and the middle part of the tread section 4a were also investigated, when the tread section 4a is heated by using only the front coil 21. From the results of investigation, it is found that the preheating with the tread section-preheating mechanism 16 according to the first embodiment provides approximately the same temperature and the same temperature-increasing rate at all of the end parts and the middle parts, as shown in FIG. 9, whereas the preheating with only the front coil 21 provides a greater temperature and a greater temperature-increasing rate at the middle part than at the ends, as shown in FIG. 10.

Accordingly, as shown in FIG. 1, the raw tire-preheating apparatus 1 according to the first embodiment comprises the tread section-preheating mechanism 16 and the movement mechanism (support mechanism 10) in FIG. 2(b), wherein the tread section-preheating mechanism 16 includes the front coil 21 disposed so as to face the tread section 4a for generating the high frequency magnetic field to apply the high frequency magnetic field to the tread section 4a and the core mechanism (center core 24, separation core 25 and side core 26) made of a ferromagnetic material having a low electrical conductivity for absorbing the high frequency magnetic field in the cores to form a uniform high frequency magnetic field in the direction of the tire width over the entire area of the tread section 4a, and wherein the movement mechanism for moving at least one of the tread section-preheating mechanism 16 and the raw tire 4 in such a way that the tread section-preheating mechanism 16 is moved along the tread section 4a. The arrangement of the core means made of a ferromagnetic material having a low electrical conductivity for absorbing the high frequency magnetic field along the raw tire 4 realizes the raw tire-preheating method for generating the high frequency magnetic field having a field distribution whereby the overall raw tire 4 is uniformly preheated.

In the first embodiment, the tread section-preheating mechanism 16 is moved relative to the tread section 4a by rotating the raw tire 4 with the support mechanism 10 as the movement mechanism. The present invention is not restricted to this arrangement. The tread section-preheating mechanism 16 can be rotated (revolved) along the tread section 4a. Otherwise, both the tread section-preheating mechanism 16 and the raw tire 4 can be rotated.

In the above arrangement, metallic elements embedded in the tread section 4a of the raw tire 4 are heated in the induction heating by the high frequency magnetic field generated from the front coil 21, and therefore the tread section 4a is preheated from the inside thereof. Accordingly, it is not necessary to maintain the entire storage space at the preheat temperature, as in the conventional method, thereby enabling the running cost for preheating to be greatly reduced. The ferromagnetic material having a low electrical conductivity used in the core mechanism absorbs the high frequency magnetic field and is capable of providing an arbitrary field distribution. As a result, the entire tread section 4a can always be uniformly preheated, even if the tread section 4a has a complicated shape, thickness and inner structure.

More specifically, the raw tire-preheating apparatus 1 according to the first embodiment is capable of preheating the raw tire 4 by the induction heating of the metallic elements (bead wire 52 and belt element 56) embedded in the raw tire 4 as shown in FIG. 4, and comprises the tread section-preheating mechanism 16 and the movement mechanism (the support mechanism 10 in FIG. 2), wherein the tread section-preheating mechanism 16 comprises the front coil 21, whose openings 22a and 23a are arranged so as to face the tread section 4a and for generating the high frequency magnetic field to apply it thereto; the rear coil 25 disposed on the rear side of the front coil 21 for generating the high frequency magnetic field in the direction opposite to that of the high frequency magnetic field generated from the front coil 21; and the separation core 27 made of the ferromagnetic material having a low electrical conductivity disposed in the position corresponding to the outer part (shoulder part) of the tread section 4a between the front coil 21 and the rear coil 27, as shown in FIG. 1 and wherein the movement mechanism for moving at least one of the tread section-preheating mechanism 16 and the raw tire 4 such that the tread section-preheating mechanism 16 may be moved relative to the tread section 4a.

In the above arrangement, the high frequency magnetic field generated from the front coil 21 and the high frequency magnetic field generated from the rear coil 27 disposed on the rear side of the front coil 21 are substantially cancelled each other. Accordingly, no high frequency magnetic field is applied to the inner part of the tread section 4a where the separation core 25 is disposed. On the other hand, the separation core 25 serves as a shielding plate for the high frequency magnetic field in the outer part (shoulder part) of the tread section 4a where the separation core 25 is disposed, so that the high frequency magnetic field from the front coil 21 is applied more strongly to the outer part. As a result, the inner part of the tread section 4a is heated exclusively by induction heating, compared with the outer part (shoulder part), and therefore the overall tread section 4a can be uniformly preheated even if the outer part (shoulder) of the tread section 4a is thicker than the inner part.

Furthermore, the tread section-preheating mechanism 16 according to the first embodiment has the center cores 24, whose front-end surfaces are close to the outer parts (shoulder parts) of the tread section 4a in the openings 22a and 23a, respectively. Accordingly, the center core 24 concentrates the high frequncy magnetic field from the front coil 21 onto the front surface, thereby enabling the magnetic field to be applied in high intensity to the outer part (shoulder part) of the tread section 4a from a position close thereto. As a result, the outer part (shoulder part) of the tread section 4a can be induction-heated more preferably than the inner part.

Furthermore, the tread section-preheating mechanism 16 according to the first embodiment has side cores 26 disposed on both sides of the front coil 21 where the front surfaces of the side cores are close to the outer parts (shoulder parts) of the tread section 4a. In this arrangement, the side core 26 and the center core 24 are disposed parallel to each other so as to absorb the high frequency magnetic field from the front coil 21 in the front-end surfaces of the cores 26 and 24, so that the high frequency magnetic field having high intensity can be applied to the outer parts (shoulder parts) of the tread section 4a from a position close thereto. As a result, the outer parts (shoulder parts) of the tread section 4a can be heated in the induction heating more strongly than the inner part.

Moreover, a plurality of the tread section-preheating mechanisms 16 according to the first embodiment can be arranged along the tread section 4a. In this case, the tread section 4a can be preheated more securely by the induction heating with the tread section preheating mechanisms 16.

In the first embodiment, the cores 24, 25 and 26 are formed, using a conductive ferromagnetic material having a low electrical comductivity, such as ferrite core or the like. However, the present invention is not restricted to such an arrangement. The cores 24, 25 and 26 can be prepared by mixing heat-resisting resin powder and magnetic powder made of either iron or metal oxide. As the heat-resisting resin, silicon sealant, epoxy resin or the like can be selected. In this case, the heat-resisting resin also serves as a powder binder, thereby making it possible to form cores 24, 25 and 26 having a complicated shape with ease. Hence, the cores 24, 25 and 26, whose shape is similar to the surface shape of the raw tire 4, can be easily formed, and therefore the magnetic field leaked from the space between the cores and the raw tire 4 can be greatly reduced. As a result, the raw tire 4 can be preheated in a short period of time, using an high frequency power supply having a relatively small capacity. In conjunction with the fact, the heat-resisting resin enhances the shock resistance of the cores 24, 25 and 26.

Each of the cores 24, 25 and 26 can also be produced by mixing a powder made of a ferromagnetic material having a low electrical conductivity, such as iron, metal oxide or the like and a heat-resisting oil and then by encapsulating the mixture into a case made of a non-magnetic material. In this case, silicon oil, grease, noncombustible oil or the like can be selected as such a heat-resisting oil, and vinyl chloride sheet, acrylic sheet, ceramic plate, wood or the like can be selected as a non-magnetic material for the case. The cores 24, 25 and 26 having a complicated shape can easily be produced from a case having a predetermined shape, in which case, the surfaces of the cores 24, 25 and 26 are protected by the case, thereby making it possible to provide an extremely greater mechanical strength (a high shock resistance) to the cores 24, 25 and 26. Moreover, each of the cores 24, 25 and 26 can also be produced by encapsulating powder of a ferromagnetic material having a low electrical conductivity in a case made of non-magnetic material.

When the cores 24, 25 and 26 are produced by mixing the powder of a ferromagnetic material having a low electrical conductivity with the heat-resisting resin and the heat-resisting oil, it is preferable that the content of the ferromagnetic material having a low electrical conductivity is varied from portion to portion in accordance with the surface shape and/or the inner structure of the raw tire 4. In this case, the magnetic field having field strength in proportion to the content of the ferromagnetic material having a low electrical conductivity can be applied to the raw tire 4, thereby enabling the tire 4 to be preheated in high efficiency.

In the first embodiment, the front coil 21 having the left front coil section 22 and the right front coil section 23 in the symmetric arrangement is described. The present invention is not restricted to such an arrangement. For instance, the front coil 21 can be constituted by only one of the left and right front coils. In the first embodiment, moreover, the coil sections 22 and 23 of the front coil 21 and the separation core 25 are arranged in the form of a V shape so as to exhibit the curved surface shape of the raw tire 4. The present invention is not restricted to such an arrangement. For instance, these elements can be arranged in a straight line, in which case, it is preferable that the heights of the center core 24 and the side core 26 are adjusted in such a way that the surfaces of these cores 24 and 26 correspond to the curved surface shape of the raw tire 4.

[Embodiment 2]

In the following, a second embodiment of the present invention will be described, referring to FIGS. 11 to 14. In this case, the same reference numeral as in the first embodiment is attached to the same element as in the first embodiment, and the explanation thereof will be omitted.

Figure 11A:
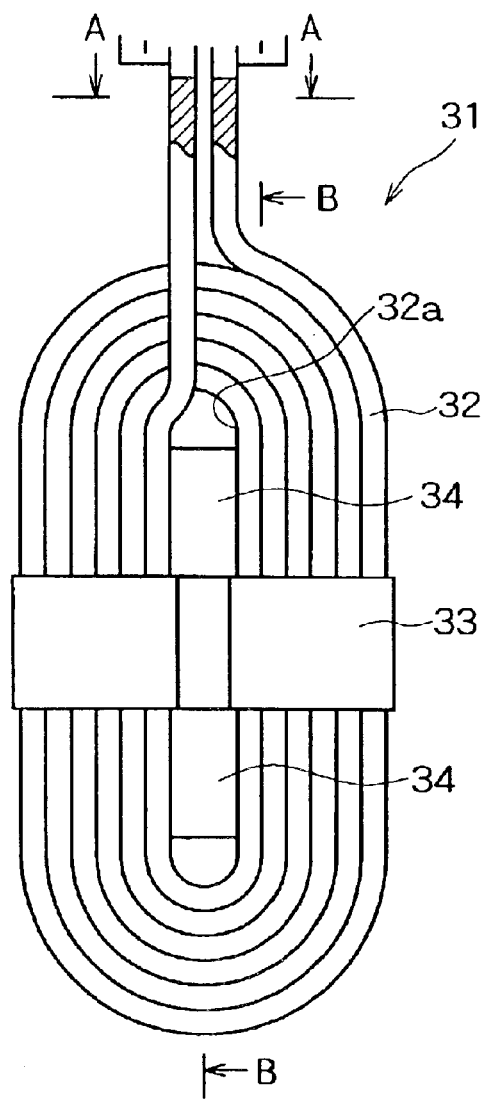
FIG. 11 is drawings showing the arrangement of a tread section-preheating mechanism: (a) front view; (b) section viewed from line B—B in (a); and (c) section viewed from line A—A in (a)
Figure 11B:
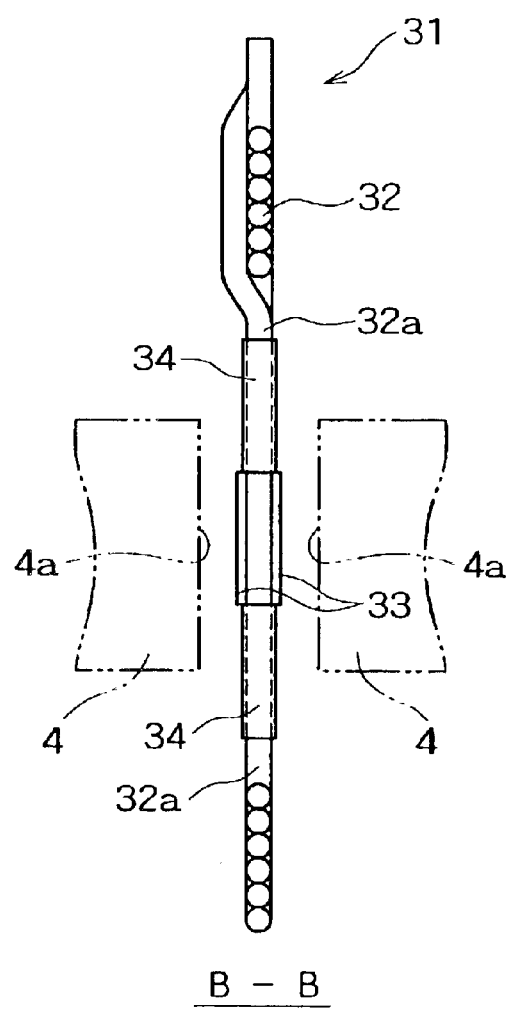
Figure 11C:
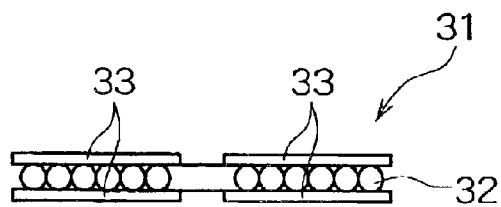

A raw tire-preheating apparatus 1 according to the second embodiment is equipped with a tread section-preheating mechanism 31, as shown in FIGS. 11(a) to (c). The tread section-preheating mechanism 31 includes a front coil 32, which is arranged in such a way that it faces the tread section 4a of the raw tire 4. Shield cores 33 made of a ferromagnetic material having a low electrical conductivity are disposed in the middle part of the front coil 32, which part corresponds to the part facing the inner part of the tread section 4a, in order to confine a high frequency magnetic field generated from the front coil 32 thereto. Upper and lower center cores 34 made of a ferromagnetic material having a low electrical conductivity are disposed symmetrically in the opening 32a of the front coil 32, so that each center core 34 is disposed to face an end of the tread section 4a of the raw tire 4.

The above-mentioned shield cores 33 are disposed respectively on the front and rear sides of the front coil 32, and the center cores 34 are also disposed respectively on the front and rear side surfaces of the front coil 32 with the same projection height. When, therefore, the raw tire 4 is positioned symmetrically on the front and rear sides, the raw tire 4 can be preheated by the induction heating under the same condition with the tread section-preheating mechanism 31. Anyway, it is noted that the structural arrangement in the second embodiment is the same as that in the first embodiment, except for the tread section-preheating mechanism 31.

The method for preheating the raw tire will be described, based on the function of the raw tire-preheating apparatus having the above-mentioned structural arrangement.

The raw tire 4 is transferred to the storage process, and then stored therein, maintaining the state in which it is rotated with the same method as in the first embodiment. Thereafter, a high frequency power is supplied from a high frequency power supply 17 to the tread section-preheating mechanism 31, so that the raw tire 4 is preheated by the induction heating of the tread section 4a. Moreover, the high frequency power is supplied to the lower bead section coil and the upper bead section mechanism (see FIG. 2), similarly to the case in the first embodiment, so that the raw tire 4a is also preheated by the induction heating of the bead sections 4c and 4c'.

The supply of the high frequency power to the tread section-preheating mechanism 31 causes the front coil 32 to generate a high frequency magnetic field. The center cores 34 are disposed in the upper and lower parts of the opening 32a in the front coil 32. The center cores 34 are made of a ferromagnetic material having a low electrical conductivity and serves to absorb the magnetic force. Accordingly, the high frequency magnetic field generated from the front coil 32 is concentrated onto the center cores 34, and occurs on the front and rear sides passing therethrough. The upper and lower parts of the front coil 32, inside which the center cores 34 are disposed, are positioned respectively in the areas which are close to the ends of the tire width direction of the raw tire 4, i.e., the tread section 4a. As a result, the high frequency magnetic fields generated from the upper and lower parts of the front coil 32 are concentrated strongly on both end parts (shoulder parts) of the tread section 4a of the raw tire 4 to heat these areas by the induction heating.

In the middle section of the tread section-preheating mechanism 31 (front coil 32) interposed between the center cores 34/34, the shield cores 33 are positioned so as to face the tread section 4a of the raw tire 4. The shield cores 33 are made of a ferromagnetic material having a low electrical conductivity, and therefore serve confining the high frequency magnetic field generated from the front coil 32 thereinto. As a result, the inner part of the tread section 4a in the raw tire 4 facing the middle part of the front coil 32 is induction-heated with a relatively decreased power by the high frequency magnetic field in the center cores 34/34, which are disposed in the upper and lower parts of the front coil 32. This provides a heat distribution in which the applied induction heating power increases from the inner part to the outer parts (shoulder parts) of the tread section 4a, thereby enabling all the tread section 4a to be preheated uniformly, even if the thickness of the tread section 4a increases from the inside to the outside (shoulder parts). The other function is the same as that in the first embodiment.

Figure 12A:
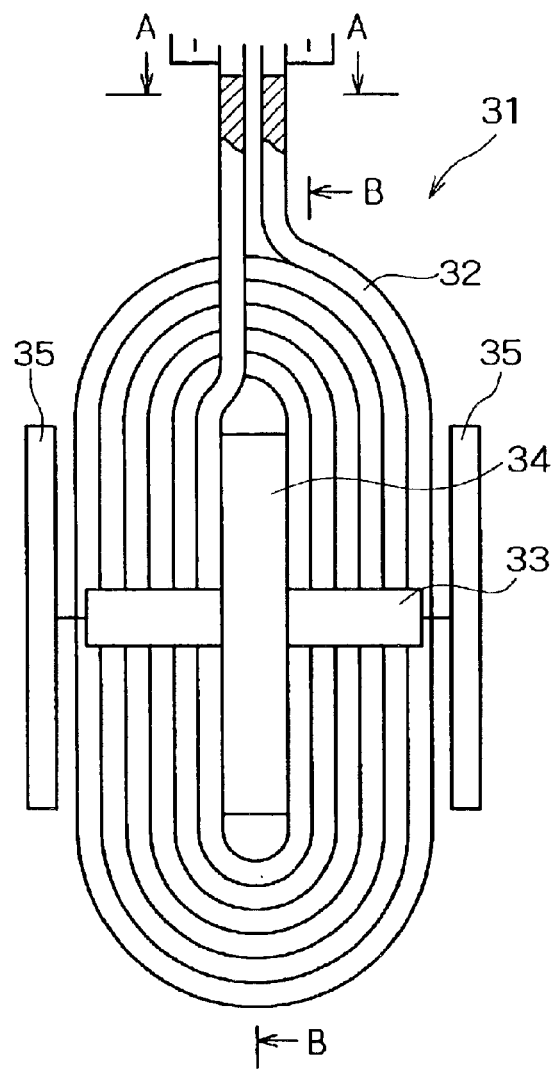
FIG. 12 is drawings showing the arrangement of another tread section-preheating mechanism: (a) front view; (b) section viewed from line B—B in (a); and (c) section viewed from line A—A in (a)
Figure 12B:
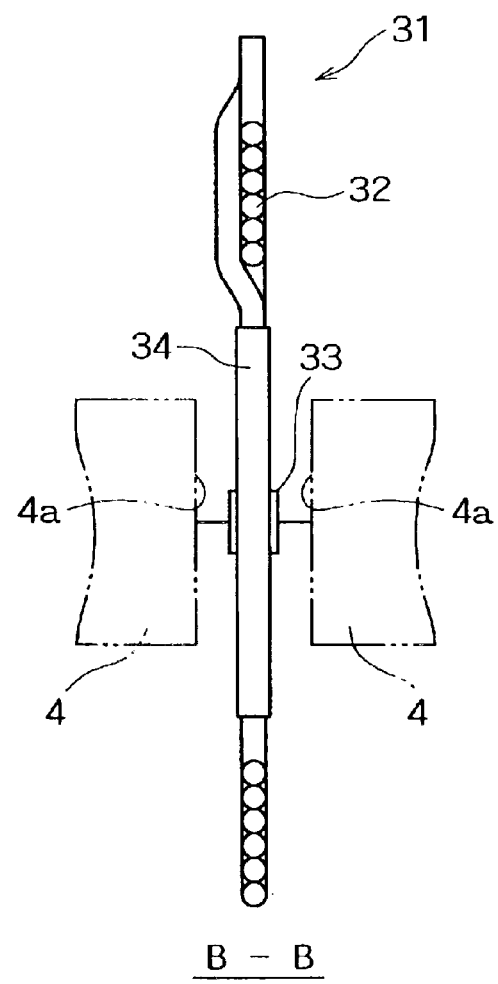
Figure 12C:
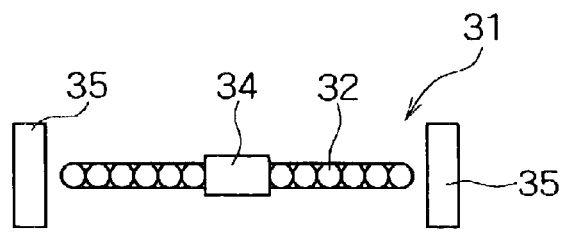

In the second embodiment, the magnetic force is concentrated by only the center cores 34/34 disposed in the upper and lower parts of the opening 32a. The present invention is not limited to this arrangement. As shown in FIGS. 12(a) to (c), the tread section-preheating mechanism 31 can be constituted by clamping the front coil 32 by a pair of one of the center cores 34 and a side core 35 disposed on the side of the corresponding center core 34.

Figure 13:
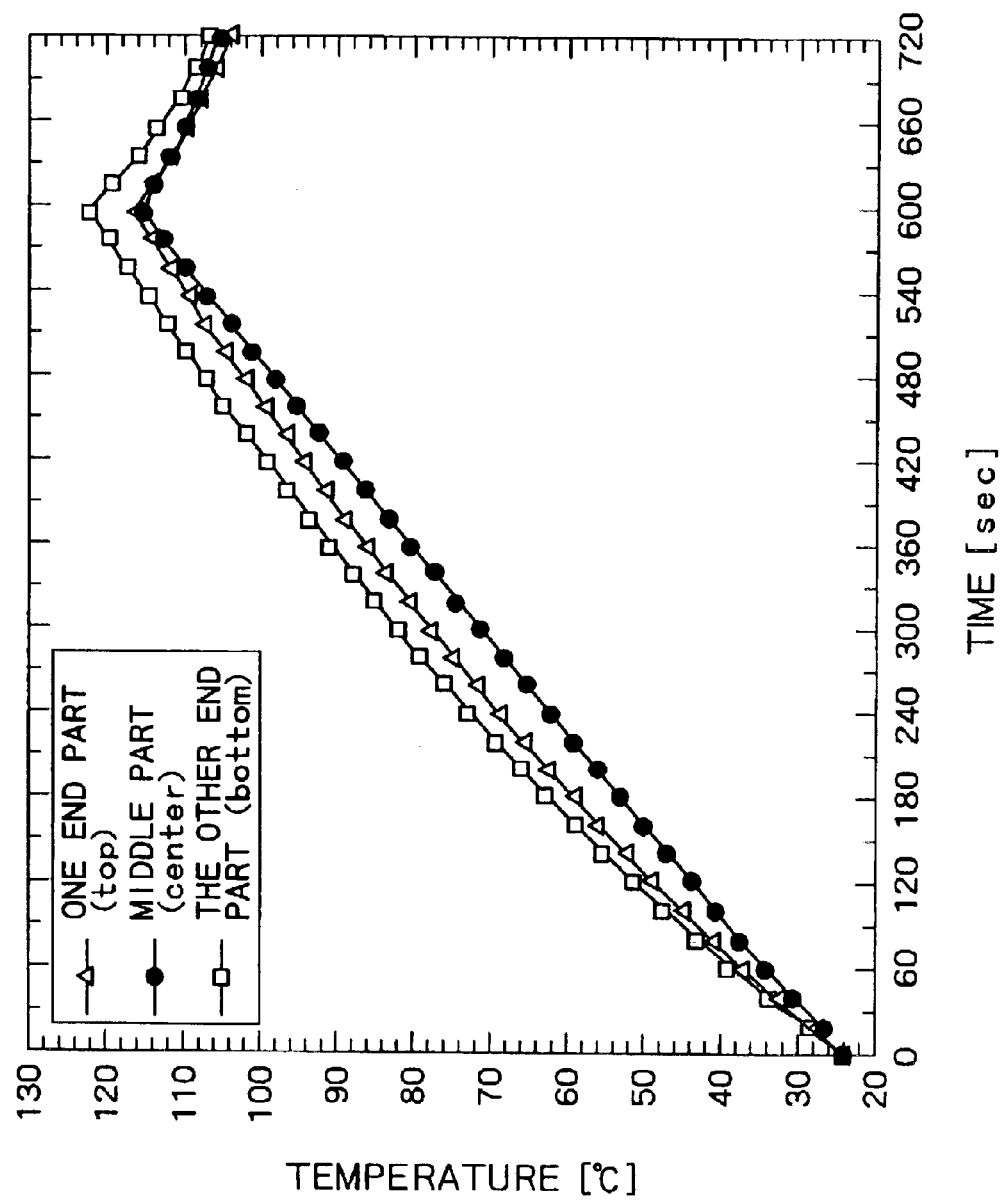
FIG. 13 is a diagram showing the temperature variation in the induction heating of a raw tire.
Figure 14:
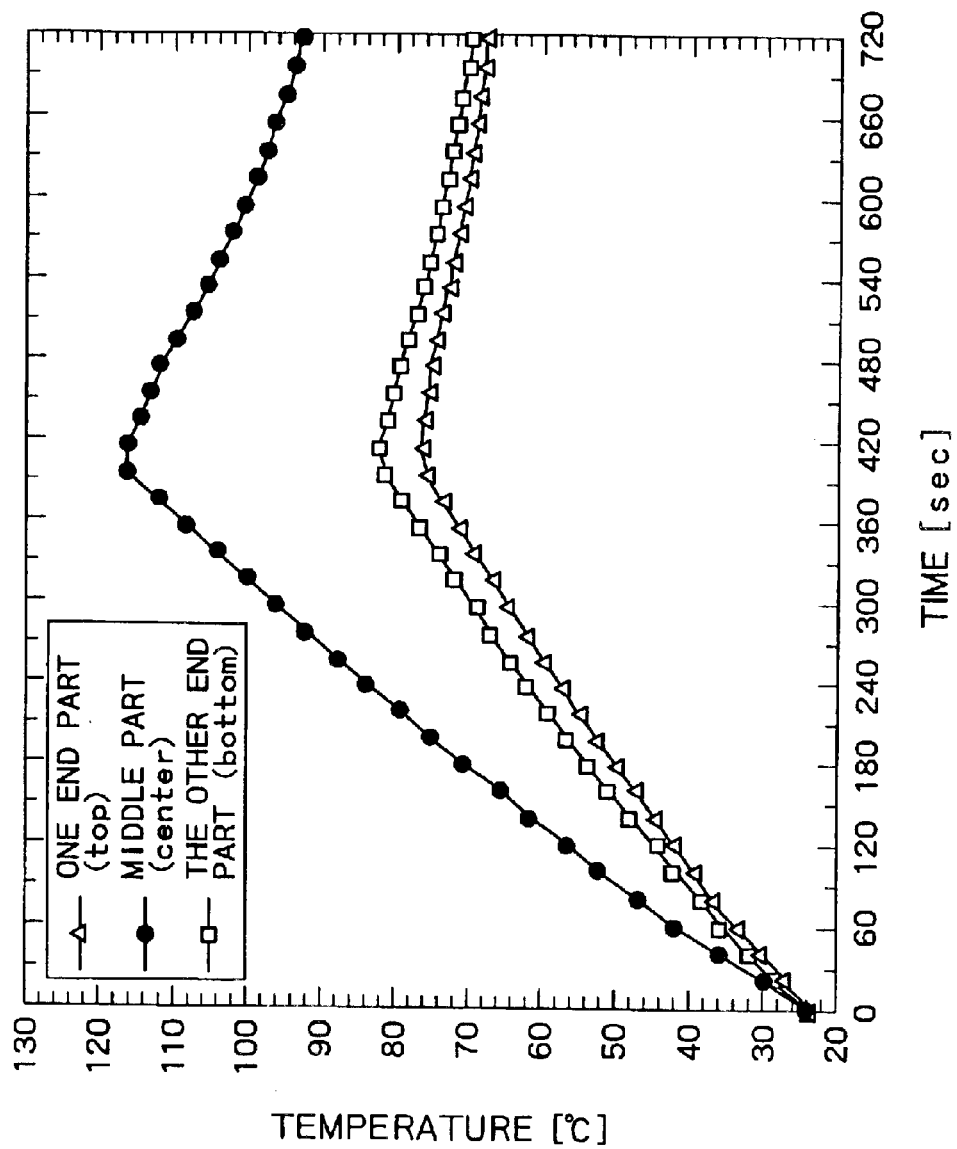
FIG. 14 is another diagram showing the temperature variation in the induction heating of a raw tire.

The above-mentioned tread section-preheating mechanism 31 was actually used to heat the tread section 4a by the induction heating, and the thermal properties as for the temperature rise were investigated for the end parts ("top" and "bottom") and the middle part ("center") of the tread section 4a. For the sake of comparison, the thermal properties as for the temperature rise were also investigated for the end parts (shoulder parts) and the middle part of the tread section 4a, using only the front coil 32. The result obtained by using the tread section-preheating mechanism 31 in the second embodiment is shown in FIG. 13. From this result, it is found that the preheating is carried out approximately at the same temperature-increasing rate for the end parts (shoulder parts) and the middle part, and at almost the same temperature for these parts. The result obtained by using only the front coil 32 is shown in FIG. 14. From the result, it is found that the temperature rising rate in the middle part is greater than that in the end parts (shoulder parts), and therefore the preheating temperature in the former is greater than that in the latter.

As described above, the raw tire-preheating apparatus 1 in the second embodiment comprises the tread section-preheating mechanism 31 and the movement mechanism (support mechanism 10) shown in FIG. 2(b), wherein the tread section-preheating mechanism 31 includes the front coil 32 disposed to face the tread section 4a for generating the high frequency magnetic field to apply it the tread section 4a as shown in FIG. 11 and FIGS. 12(a) to (c); and (shield cores 33, center cores 34 and side cores 35) made of a conductive ferromagnetic material to absorb the high frequency magnetic field so as to provide its distribution with which the tread section 4a is uniformly preheated overall in the tire width direction, and the movement mechanism for moving at least one of the tread section-preheating mechanism 16 and the raw tire 4 so as to move the tread section-preheating mechanism 16 relative to the tread section 4a.

In this arrangement, the metallic elements embedded in the tread section 4a of the raw tire 4 are heated in the induction heating by the high frequency magnetic field generated from the front coil 32, so that the tread section 4a is preheated from its inside. Accordingly, in this arrangement, it is not necessary that the depository maintain at the preheating temperature, as in the conventional method, thereby enabling the running cost to be greatly reduced. Moreover, the employment of an appropriate core mechanism made of the ferromagnetic material having a low electrical conductivity for absorbing the high frequency magnetic field makes it possible to provide a varied field distribution, thereby enabling the tread section 4a to be preheated uniformly over all the areas, even if the tread section 4a has a complicated shape, varied thickness, and complicated inner structure.

In conjunction with the above, there is no limitation with regard to the installation locations at which the core mechanism is disposed so long as they provide such a desired field distribution. However, it is preferable to employ the structural arrangement according to the embodiment where the shield cores 33 disposed to face the inner part of the tread section 4a in between the tread section 4a and the front coil 32. In this case, the shield cores 33 disposed to face the inner part of the tread section 4a shields the high frequency magnetic field generated from the front coil 32, so that the tread section 4a is heated more preferably by the induction heating in the outer parts (shoulder parts) than in the inner part.

Moreover, in the second embodiment, the core mechanism includes the center core 34 whose front surface is positioned to be close to the outer parts (shoulder parts) of the tread section 4a in its opening 32a in such a manner that the opening 32a of the front coil 32 faces the tread section 4a. In this arrangement, the shield cores 33 disposed to face the inner part of the tread section 4a shields the high frequency magnetic field from the front coil 21. On the other hand, the center cores 24 absorbs the high frequency magnetic field generated from the front coil 21 to concentrate it on its front surface, so that the magnetic field having high intensity is applied from a very close position to the outer parts (shoulder parts) of the tread section 4a. As a result, the tread section 4a is induction-heated more preferably in the outer parts (shoulder parts) than the inner part.

In FIGS. 12(a) to (c), moreover, the core mechanism is equipped with the side cores 35 which are disposed on the side surfaces of the front coil 32 in such a manner that the front surfaces of the side cores are close to the outer parts (shoulder parts) of the tread section 4a. In this arrangement, the side cores 26 and the center cores 24 are disposed in parallel, and therefore these cores 26 and 24 absorb the high frequency magnetic field generated from the front coil 21 to concentrate it on their front-end surfaces, thereby making it possible to apply the magnetic field having high intensity from the closer position to the outer parts (shoulder parts) of the tread section 4a. Accordingly, the tread section 4a can be heated by the induction heating more preferably in the outer parts (shoulder parts) than in the inner part.

[Embodiment 3]

In the following, a third embodiment of the present invention will be described, referring to FIGS. 15 to 24. In this case, the same reference numeral as in the first embodiment is attached to the same element as in the first embodiment, and the explanation thereof will be omitted.

Figure 15:
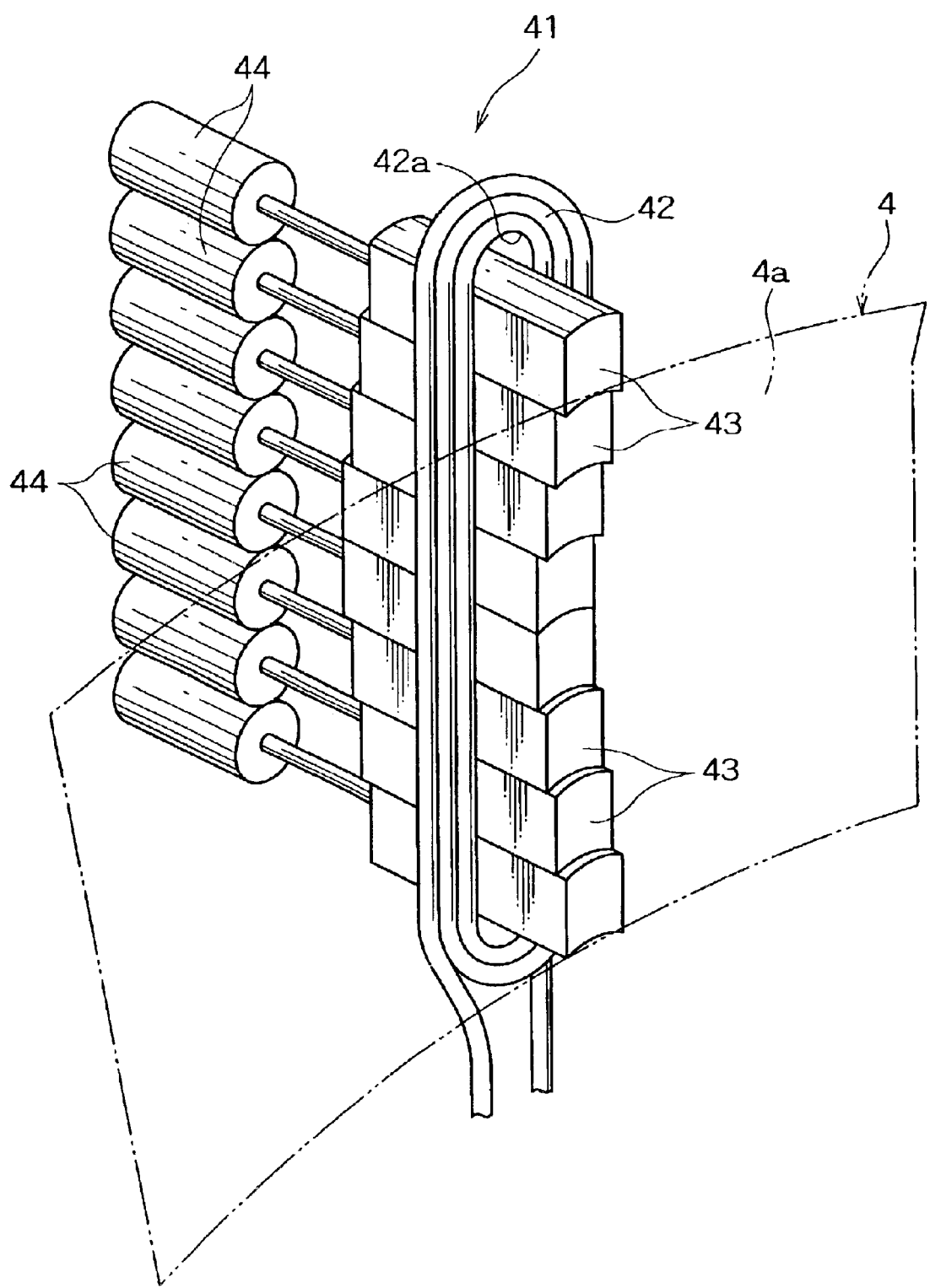
FIG. 15 is a perspective view of a tread section-preheating mechanism.

A raw tire-preheating apparatus 1 according to the third embodiment is equipped with a tread section-preheating mechanism 41, as shown in FIG. 15. The tread section-preheating mechanism 41 includes a front coil 42, which is disposed to face the tread section 4a of the raw tire 4. The front coil 42 is constructed in an annular form of an ellipse, such that its apsidal direction is aligned in the width direction of the raw tire 4 and the size of the opening in the axial direction is greater than the tread section 4a.

Core blocks 43 made of a ferromagnetic material having a low electrical conductivity are inserted into the opening 42a of the front coil 42 in the form of a straight line, which is aligned in the axial direction of the front coil. Each core block 43 is constructed in the form of a parallelepiped, such that its front-end surface faces the tread section 4a of the raw tire 4. On the rear-end surface, a block driving mechanism 44, such as pneumatic or hydraulic cylinder, is mounted for each core block 43. Each core block 43 may be moved in the direction towards the raw tire 4 by means of the block driving mechanism 44, thereby making it possible to adjust the distance between the front-end surface of each core clock 43 and the tread section 4a in a desired value. The structural arrangement in the third embodiment is the same as that in the first embodiment, except the other points.

The method for preheating the raw tire will be described, based on the function of the raw tire-preheating apparatus having the above-mentioned structural arrangement.

The raw tire 4 is transferred to the storage process, and then stored therein, maintaining the state in which it is rotated with the same method as in the first embodiment. Then, each core block 43 is moved and positioned by the corresponding block driving mechanism 44, such that the distance between the front-end surface of the core block 43 and the tread section 4a of the raw tire 4 decreases from the inside to the outside as shown in FIGS. 16(a) and (b). Thereafter, a high frequency power is supplied from the high frequency power supply 17 to the tread section-preheating mechanism 41, so that the raw tire 4 is preheated by induction heating the tread section 4a. At the same time, similarly to the first embodiment, the high frequency power is also supplied to both the lower bead section-preheating coil and the upper bead section-preheating mechanism (see FIG. 2), thereby enabling the bead sections 4c and 4c' of the raw tire 4 to be preheated by the induction heating.

The supply of the high frequency power to the tread-preheating mechanism 41 causes the high frequency magnetic field to be generated from the front coil 42. Each core block 43 disposed in the opening 42a of the front coil 42 absorbs the high frequency magnetic field and emits it from its front-end surface in a concentrated intensity. In this case, each core block 43 is positioned such that the distance between the tread section 4a of the raw tire 4 and the block decreases from the inside to the outside. The high frequency magnetic field having approximately the same magnetic flux density is supplied from each core block 43 and it is applied to the inner part of the tread section 4a which is located in a relatively larger position from the core block, so that the inner part is induction-heated with a reduced intensity, while the outer parts (shoulder parts) of the tread section 4a in a relatively smaller position is induction-heated with an increased intensity. As a result, the distribution of heat, whose magnitude increases from the inner part to the outer parts (shoulder parts) of the tread section 4a, can be obtained by the induction heating, thereby enabling the tread section 4a to be preheated approximately uniformly overall its area, even if the thickness of the tread section 4a increases from the inside to the outside. The other functions in the third embodiment are the same as those in the first embodiment.

As described above, the raw tire-preheating apparatus 1 in the third embodiment is equipped with the tread section-preheating mechanism 41 comprising the front coil 42, whose opening 42a is disposed to face the tread section 4a of the raw tire 4; and the core blocks 43 wherein the distance between the front-end surface of the corresponding core block and the tread section 4a gradually decreases from the inner part to the outer parts (shoulder parts). As a result, the core blocks 43 absorb the high frequency magnetic field and emit it from the front-end surface, after concentrating the magnetic field therein, hence enabling the outer parts (shoulder parts) of the tread section 4a to be induction-heated more strongly than the inner part.

In accordance with the third embodiment, the tread section-preheating mechanism 41 comprises a plurality of separate core blocks 43. However, these core blocks 43 can be unified into a block. Moreover, in the tread section-preheating mechanism 41 according to the third embodiment, the core blocks 43 can be separately positioned, using the corresponding block driving mechanism 44. However, the present invention is not limited to such an arrangement. As shown in FIGS. 17(a) and (b), it is possible that a nonmagnetic spacer 45 is adhered to the rear-end surface s of all the core blocks 43, thereby allowing the core blocks 43 to be disposed in predetermined positions with the spacer 45. In this case, the core blocks 43 can be positioned at high precision, and the work to adjust the position of the core blocks 43 can be easily and quickly performed, if various spacers 45 are prepared in accordance with the type of the raw tire 4 to be preheated.

In another tread section-preheating mechanism 41, the core blocks 43 can be separately positioned by a screw mechanism which comprises nonmagnetic screw elements 46 which come into contact with the rear-end surface s of the core blocks 45; and a screw support element 47 for holding the screw elements 46 to move the core blocks 45 towards the raw tire 4, as shown in FIGS. 18(a) and (b). In this case, the position of each core block 43 can be finely adjusted by rotating the screw elements 46.

Figure 19A:
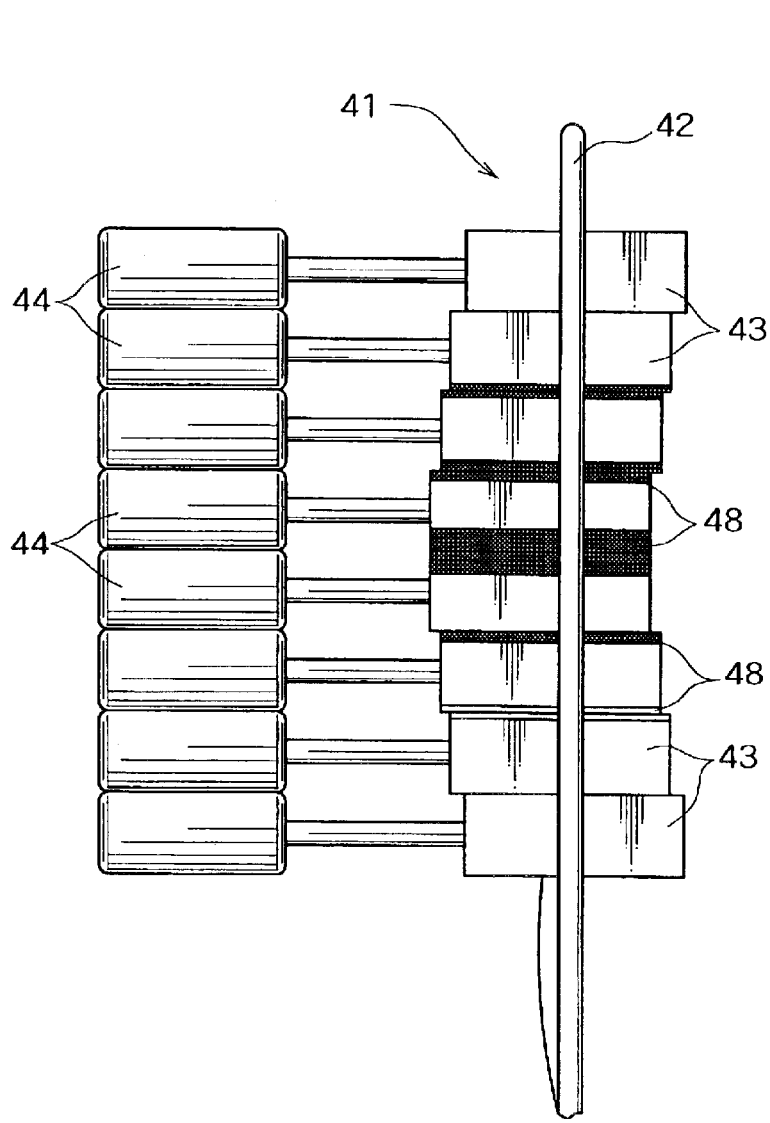
FIG. 19 is drawings showing the arrangement of another tread section-preheating mechanism: (a) front view; and (b) side view.
Figure 19B:
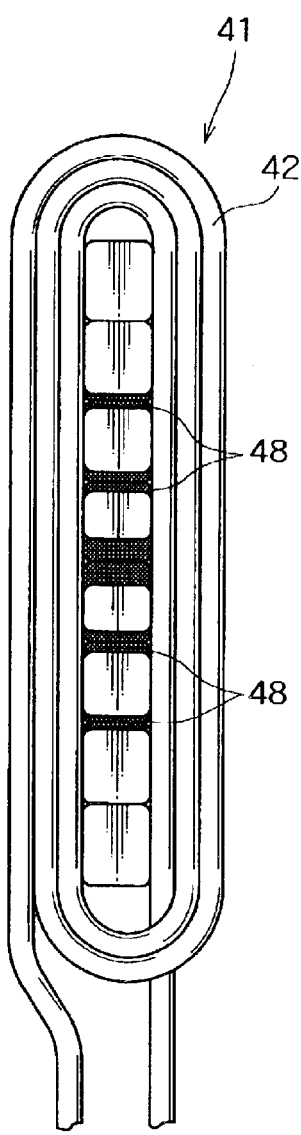
Figure 20:
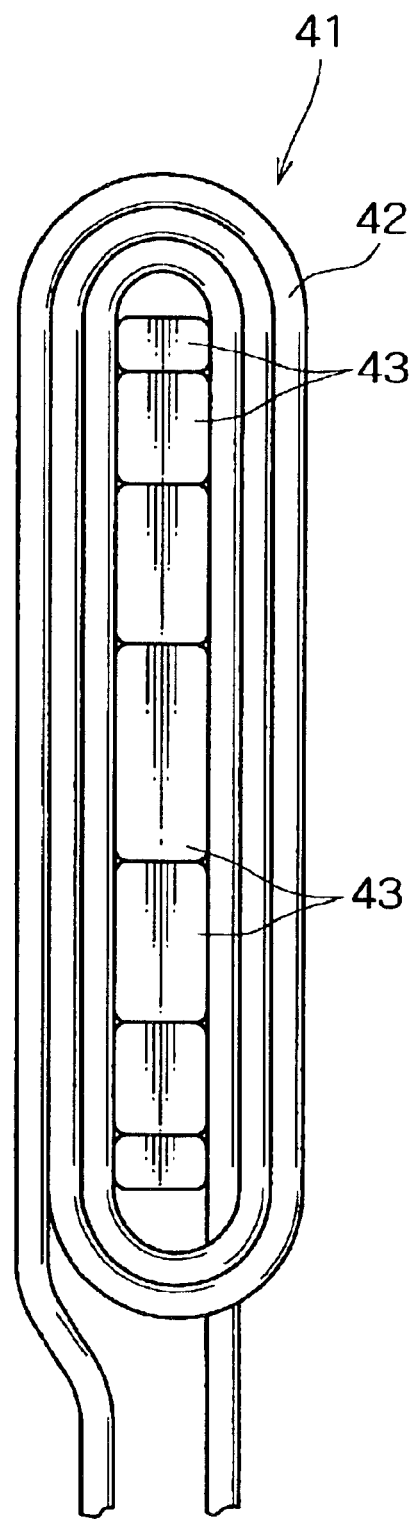
FIG. 20 is a plan view of another tread section-preheating mechanism.

In another tread section-preheating mechanism 41, it is possible that each of non-magnetic plate spacers 48 is inserted between two adjacent core blocks 43, as shown in FIGS. 19(a) and (b). In this case, the intensity distribution of the high frequency magnetic field applied to the raw tire 4 can be adjusted in the tire width direction by varying the thickness of the plate spacers 48. In another tread section-preheating mechanism 41, the thickness in the longitudinal direction varies from core block to core block, as shown in FIG. 20. In this case, the core blocks 43 can be arranged optimally in the tire width direction of the raw tire 4 by combining the core blocks 43 having a varied thickness.

Figure 21A:
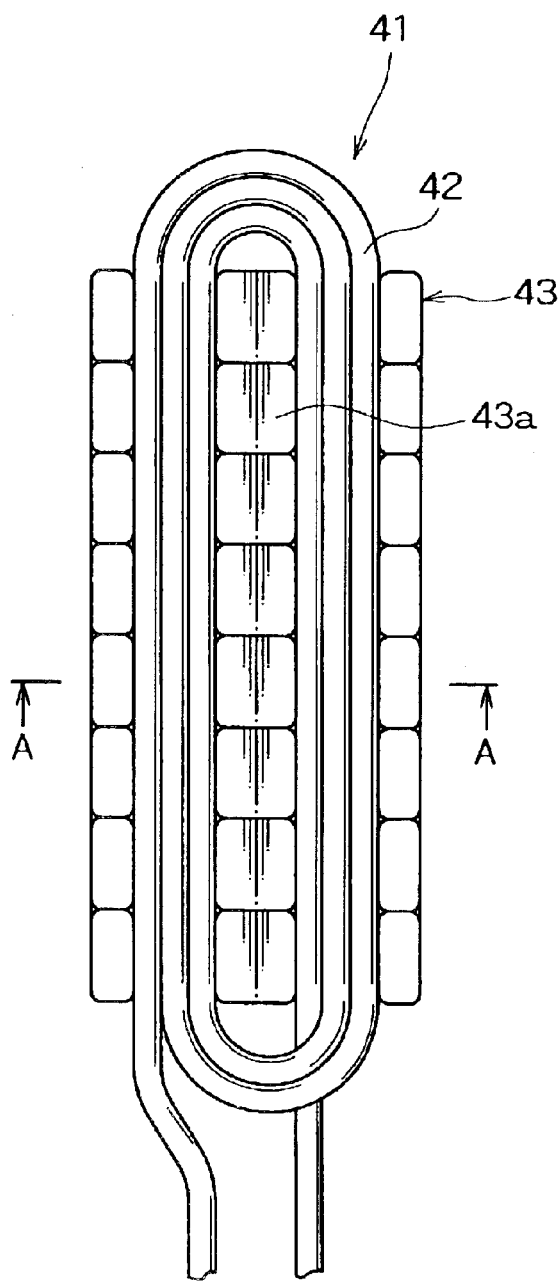
FIG. 21 is drawings showing the arrangement of another tread section-preheating mechanism: (a) front view and (b) section viewed from line A—A in (a)
Figure 21B:
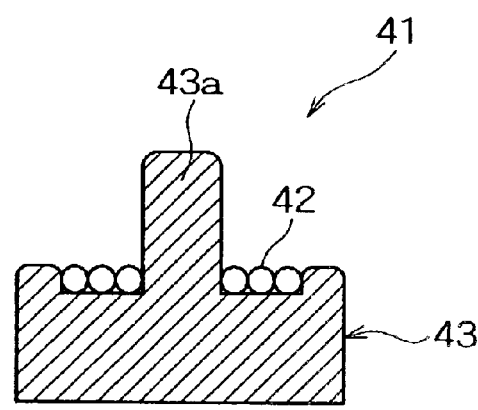
Figure 22:
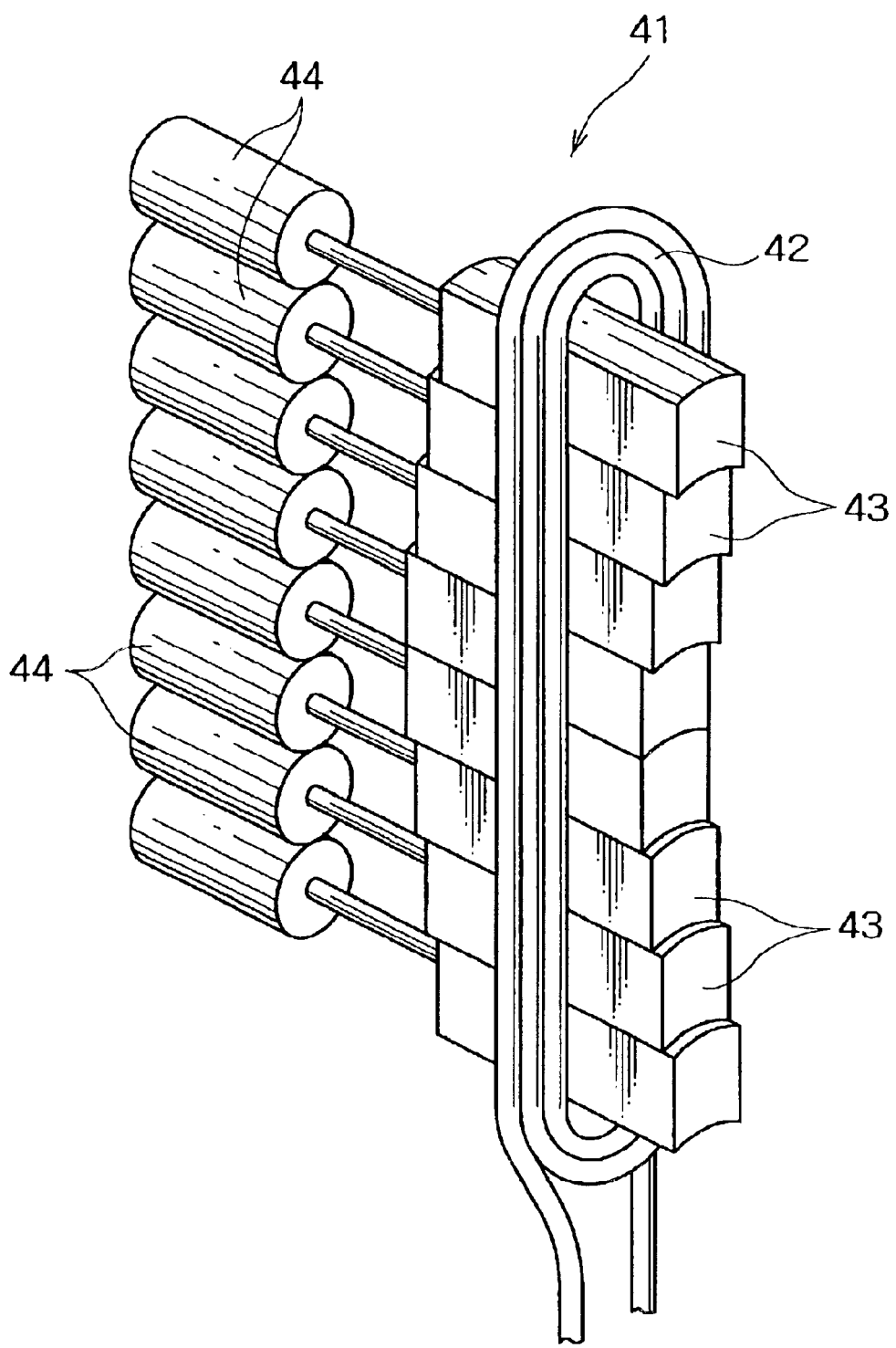
FIG. 22 is a perspective view of another tread section-preheating mechanism.

In another tread section-preheating mechanism 41, each core block 43 has a center projection part 43a inserted into the opening 42a of the front coil 42 and groove parts 43b disposed on both sides of the center projection part 43a for mounting the front coil 42 thereon, as shown in FIGS. 21(a) and (b). In this case, the magnetic field leaked outwards from the core block 43 can be effectively suppressed. In another tread section-preheating mechanism 41, moreover, each core block 43 can be formed such that its front-end surface has a curved shape, as shown in FIG. 22. In this case, the high frequency magnetic field exhibits a field distribution in which the intensity is concentrated on the side of the raw tire 4.

Figure 23:
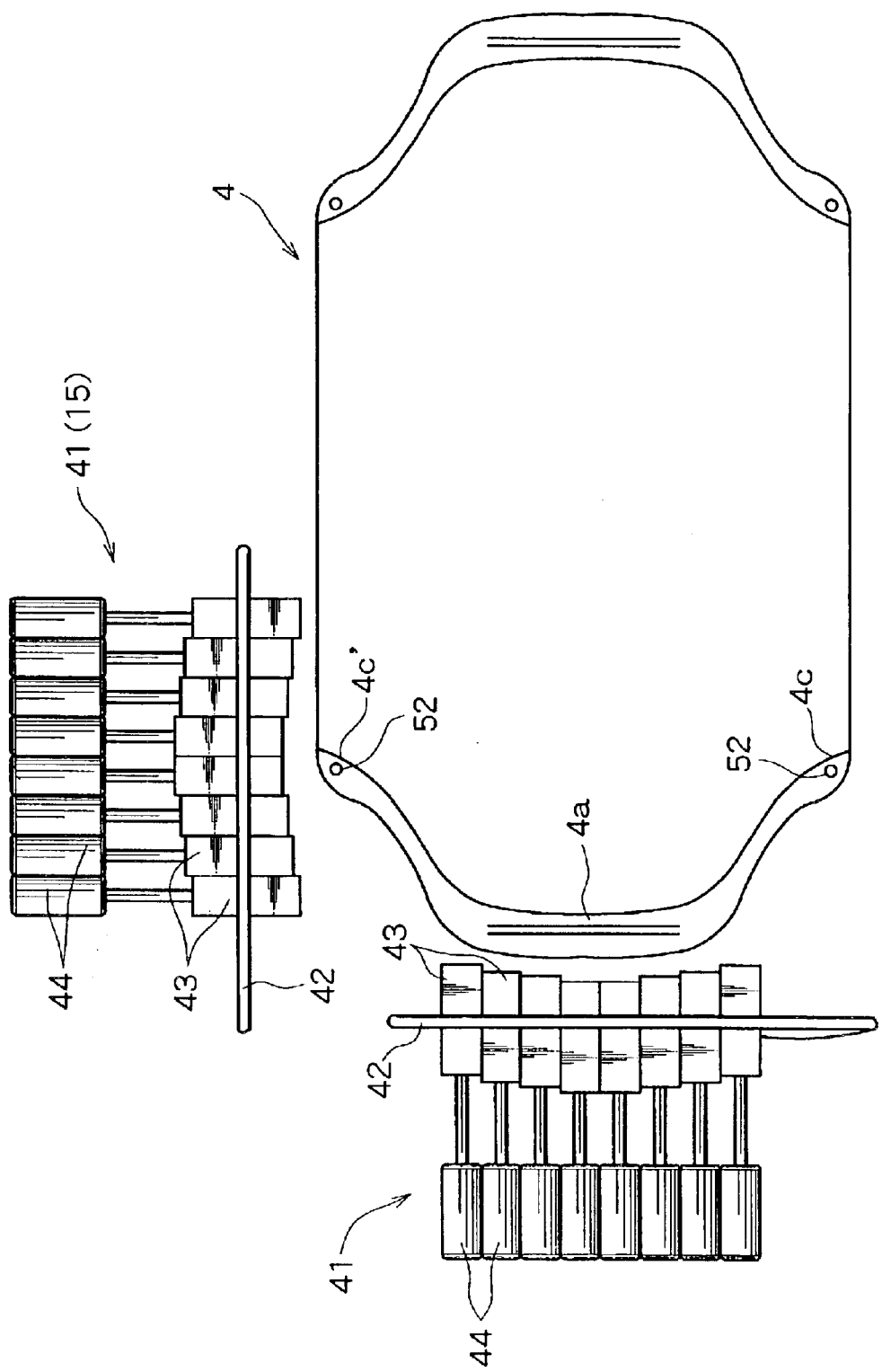
FIG. 23 is a drawing showing the state of preheating the upper bead part of a raw tire by using a tread section-preheating mechanism.
Figure 24:
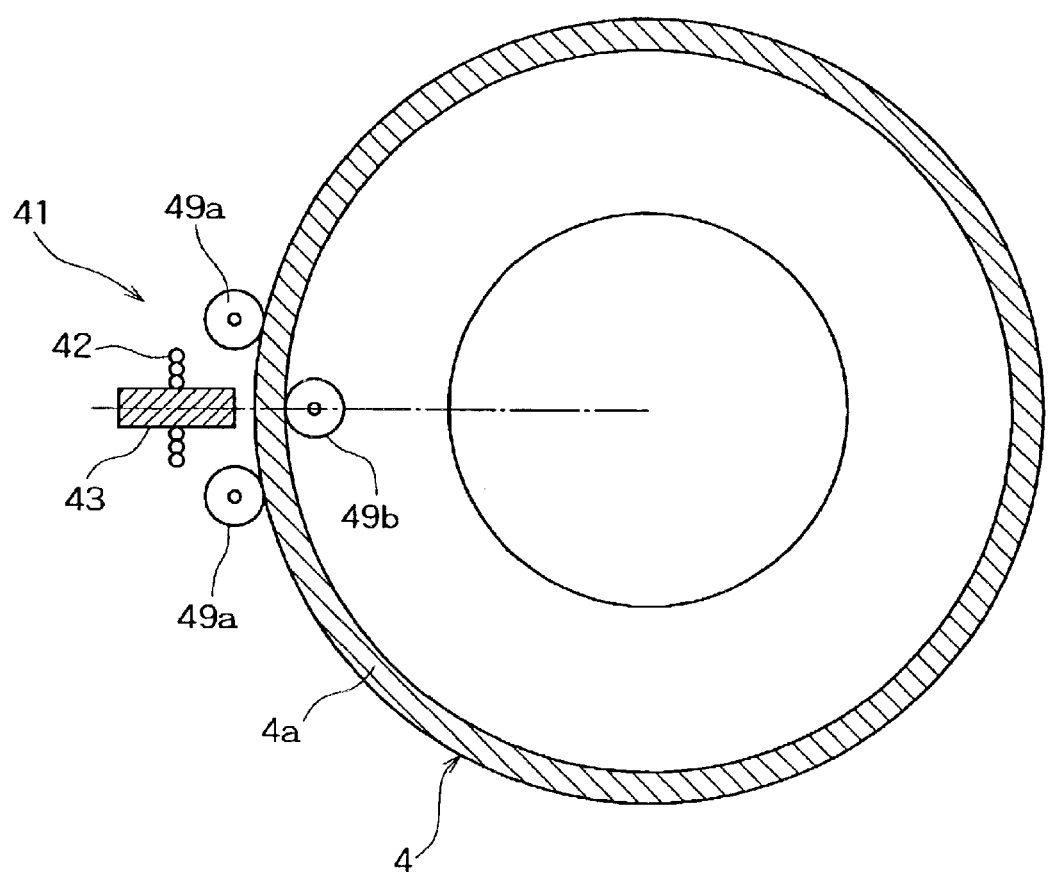
FIG. 24 is a drawing showing the state of holding a tread section of a raw tire with roller elements.

Moreover, the tread section-preheating mechanism 41 can be used as the upper bead section-preheating mechanism 15 by disposing it above the upper bead section 4c', as shown in FIG. 23. In this case, the high frequency magnetic field can be concentrated in the upper bead section 4c'. Moreover, another tread section-preheating mechanism 41 can be equipped with roller elements 49a and 49b rotatably mounted, and the tread section 4a can be clamped by the roller elements 49a and 49b, applying the former to the outside surface and the latter to the inside surface of the tread section 4a. In this case, clamping the tread section 4a with the roller elements 49a and 49b ensures that the spacing between the tread section 4a and the core block 43 maintains a predetermined value, when the raw tire 4 is rotated.

[Embodiment 4]

In the following, a fourth embodiment of the present invention will be described, referring to FIGS. 25 to 30. In this case, the same reference numeral as in the first embodiment is attached to the same element as in the first embodiment, and the explanation thereof will be omitted.

Figure 25:
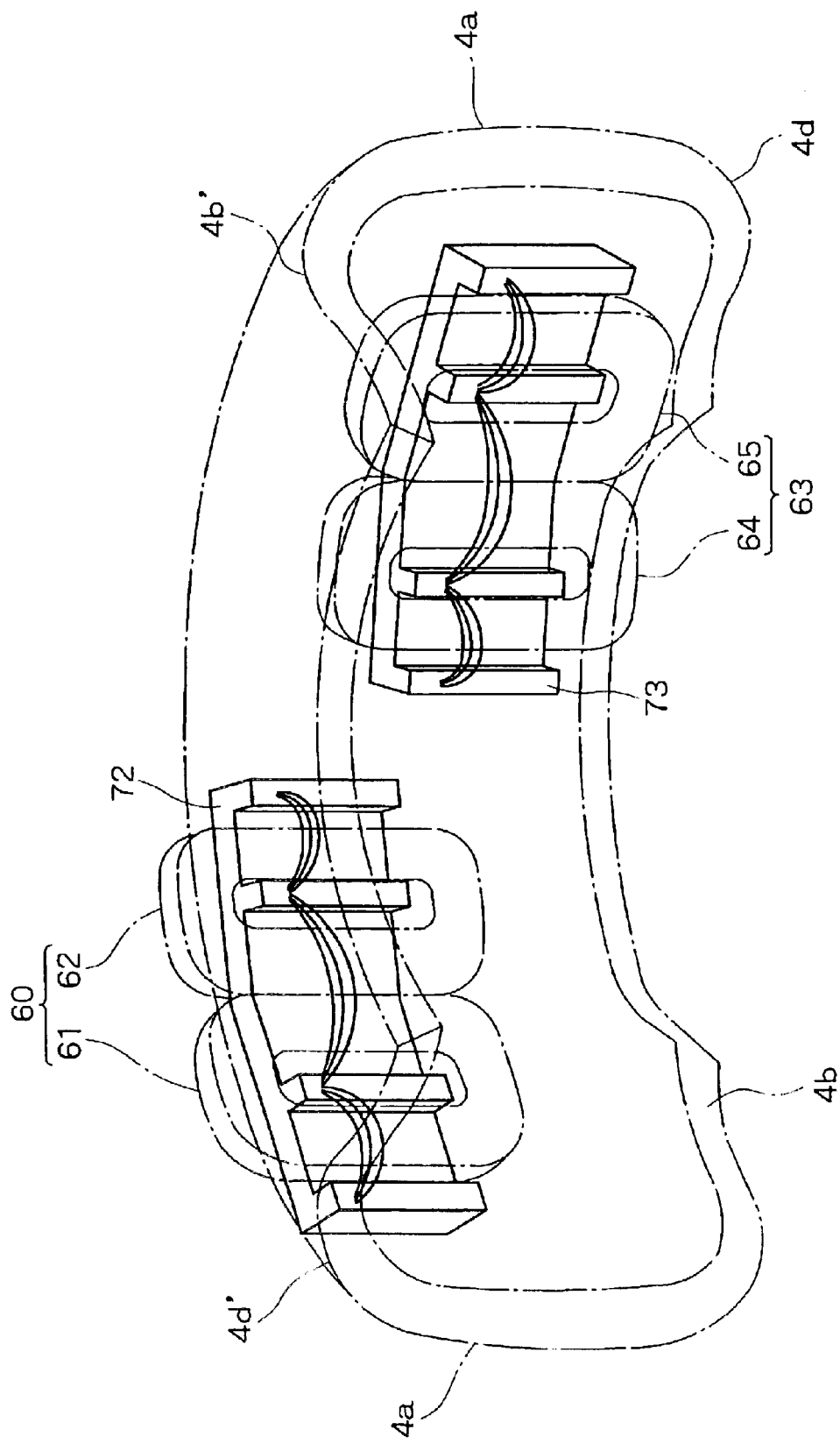
FIG. 25 is a front view of a raw tire-preheating apparatus.

A raw tire preheating apparatus 1 according to the fourth embodiment comprises a set of an upper core 72 and an upper coil 60 including a pair of left and right coil parts 61 and 62; and a set of a lower core 73 and a lower coil 63 including a pair of left and right coil parts 64 and 65, as shown in FIG. 25. The upper coil 60 is disposed such that it is close to the front surface of the upper shoulder part 4d' of the raw tire 4, whereas the lower coil 63 is disposed such that it is close to the front surface of the upper shoulder part 4d of the raw tire 4. In this case, the upper shoulder part 4d' corresponds to an area at which the tread section 4a overlaps the upper side wall 4b', as shown in FIG. 8, whereas the lower shoulder part 4d corresponds to an area at which the tread section 4a overlaps the lower side wall 4b, as shown in FIG. 8.

Figure 26:
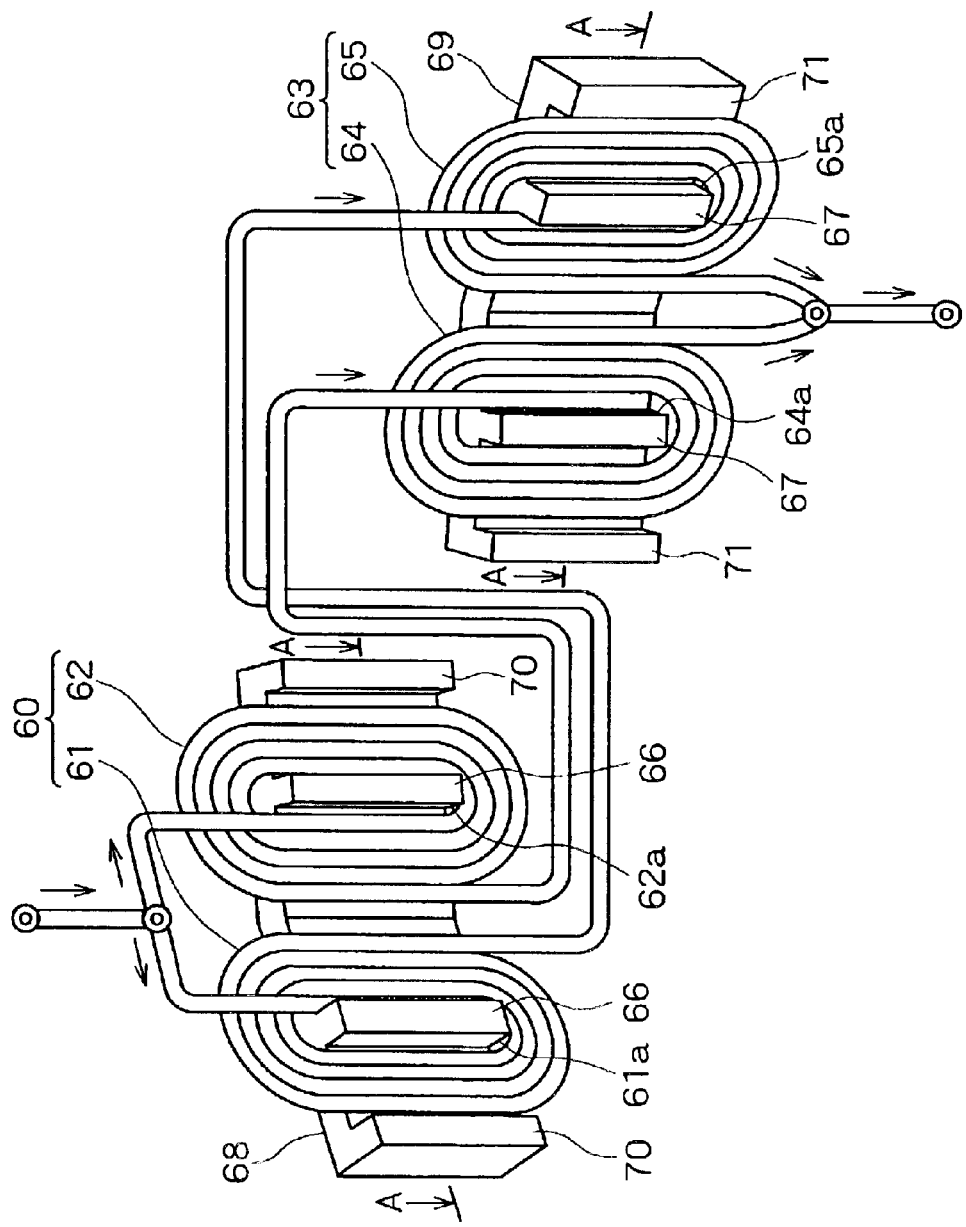
FIG. 26 is a drawing of the raw tire-preheating apparatus in front view.

Each coil part 61 or 62 and each coil part 64 or 65 is formed respectively by an annular winding having an elliptic shape and the sense of winding is reversed to each other, as shown in FIG. 26. In this case, each coil part 61 or 62 and each coil part 64 or 65 is arranged in such a manner that the apsidal direction of its winding is aligned in the tire width direction of the raw tire 4. Moreover, the coil part 61 and the coil part 64 are connected in series to each other, and the coil part 62 and the coil part 65 are also connected in series to each other. However, the coil part 61 is connected in parallel to the coil part 62 and the coil part 64 is also connected in parallel to the coil part 65. That is, it is possible that one coil part of the upper coil 60 is connected in series to one coil part of the lower coil 63 and the other coil part of the upper coil 60 is connected in series to the other coil part of the lower coil 63, wherein the former serial circuit is connected in parallel to the latter serial circuit. Accordingly, it is possible that the coil part 61 is connected in series to the coil part 65 and the coil part 62 is also connected in series to the coil part 64, wherein the former serial circuit is connected in parallel to the latter serial circuit.

Center cores 66, 66 and center cores 67, 67, which are made of a ferromagnetic material having a low electrical conductivity and are used to absorb the magnetic force, are mounted respectively in openings 61a, 62a of the coil parts 61, 62 and openings 64a, 65a of the coil parts 64, 65, as shown in FIG. 26. In this case, ferrite cores, laminated silicon steel sheets, or the like can be employed for the center cores made of the ferromagnetic material having a low electrical conductivity. Each of the center cores 66, 66 and 67, 67 is formed such that its upper surface is positioned closer to the raw tire 4 than the upper coil 60 or the lower coil 63, along with approaching the upper and lower shoulders 4d' and 4d of the raw tire 4.

Figure 27:
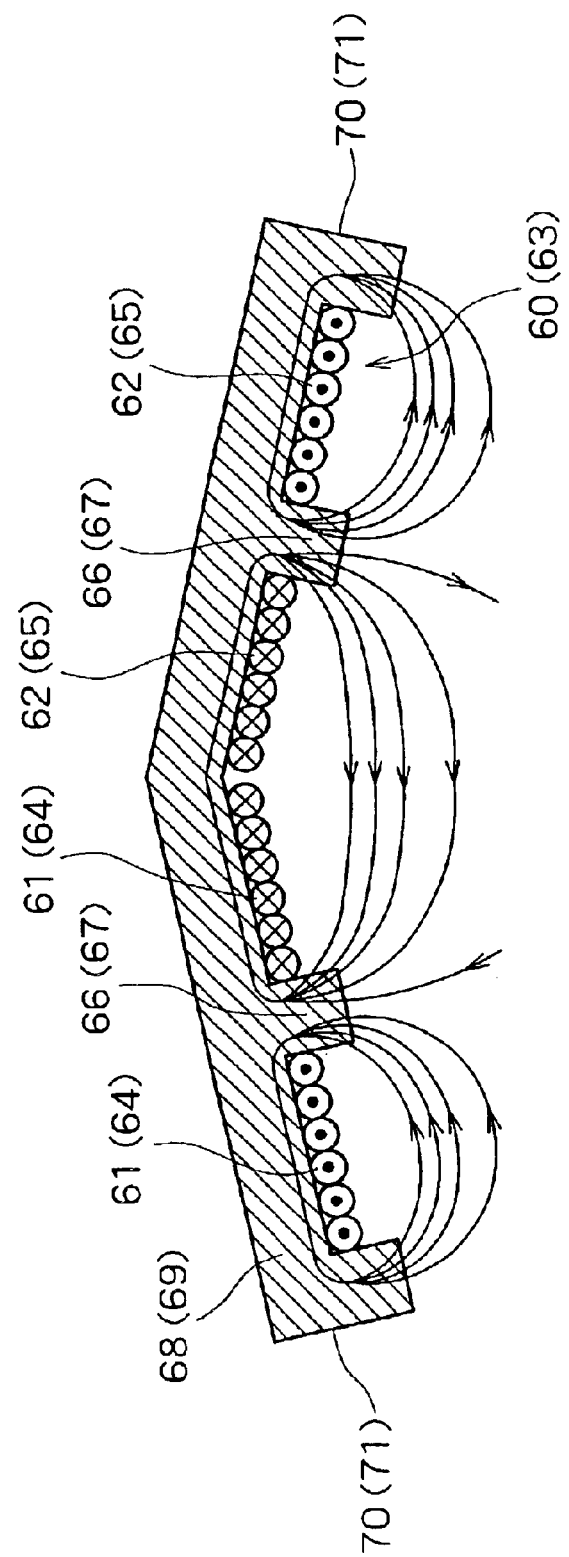
FIG. 27 is a section viewed from line A—A in FIG. 26.

Moreover, as shown in FIG. 26, the center cores 66, 66 and 67, 67 are mounted respectively onto rear cores 68 and 69, which are made of a ferromagnetic material having a low electrical conductivity. The rear core 68 is disposed in the horizontal direction on the rear side of the upper coil 60, and the rear core 69 is disposed in the horizontal direction on the rear side of the lower coil 60. In conjunction with the above, each of the rear cores 68 and 69 is constituted in a V shape such that it is arranged along the side coil part 61, 64 and the right coil part 62, 65 in accordance with the curvature of the outer circumferential surface of the raw tire 4, and both the ends of the rear core 68 or 69 are positioned at the outside of the upper and lower coil 60 and 63, as shown in FIG. 27. Moreover, as shown in FIG. 26, side cores 70, 70 and 71, 71, which are made of a ferromagnetic material having a low electrical conductivity, are mounted onto the sides of the respective rear core 68 and 69. Each side core 70 or each side core 71 is arranged such that the raw tire 4 is closer to the upper surface of the side core than the upper or lower coil 60 or 63. The upper coil 60 is clamped by one of the center cores 66, 66 and one of the side cores 70, 70 connected to each other via the rear core 68. Accordingly, as is also shown in FIG. 27, the lines of magnetic force are concentrated onto the cores 70, 70, and 66, 66, thereby enabling the upper shoulder part 4d' to be heated exclusively by the induction heating. Similarly, the lower coil 63 is clamped by one of the center cores 67, 67 and one of the side cores 71, 71 connected to each other via the rear core 69. Accordingly, as is also shown in FIG. 27, the lines of magnetic force are concentrated onto the cores 71, 71, and 67, 67, thereby enabling the upper shoulder part 4d to be heated exclusively by the induction heating.

The method for preheating the raw tire will be described, based on the function of the raw tire-preheating apparatus having the above-mentioned structural arrangement.

The raw tire 4 is transferred to the storage process, and then stored therein, maintaining the state in which it is rotated with the same method as in the first embodiment. The supply of a high frequency power from the high frequency power supply 17 to the raw tire preheating apparatus 1 causes the shoulder parts 4d and 4d' of the raw tire 4 to be heated by the induction heating.

When the high frequency power is supplied to the raw tire preheating apparatus 1, the upper coil 60 and lower coil 63 generate high frequency magnetic fields. The upper coil 60 includes the center cores 66 and side cores 70 which are coupled to each other via the rear core 68. The cores 66, 68 and 70 are made of a ferromagnetic material having a low electrical conductivity, so that they serve to absorb the magnetic force. As a result, the high frequency magnetic field generated from the upper coil 60 is concentrated onto both the center core 66 and side core 70 after passing through the rear core 68, and then appears on the surface side, that is, on the side of the raw tire 4, as shown in FIG. 27. Similarly, the lower coil 63 includes the center cores 67 and side cores 71 which are coupled to each other via the rear core 69. The cores 67, 69 and 71 are made of a ferromagnetic material having a low electrical conductivity, so that they serve to absorb the magnetic force. As a result, the high frequency magnetic field generated from the lower coil 63 is concentrated onto both the center core 67 and side core 71, after passing through the rear coil 69, and then appears on the surface side, that is, on the side of the raw tire 4, as shown in FIG. 27. Consequently, the high frequency magnetic fields generated from the upper coil 60 and the lower coil 63 are applied to the shoulder parts 4d and 4d' of the raw tire 4 in high intensity to heat exclusively the parts by the induction heating. In other words, the lines of magnetic force arriving at the belt element 56 (metallic element) inside the tire increase in its intensity and proceed in the direction approximately parallel to the scanning direction of the belt element 56. Thus, the lines of magnetic force allow the eddy current to be generated in the belt element 56 with high efficiency and therefore providing the Joule heating thereto with high efficiency. Moreover, since the upper coil 60 and the lower coil 63 face the shoulder parts 4d and 4d', respectively, the center of the tread section 4a is heated, maintaining in relatively small intensity.

Figure 28:
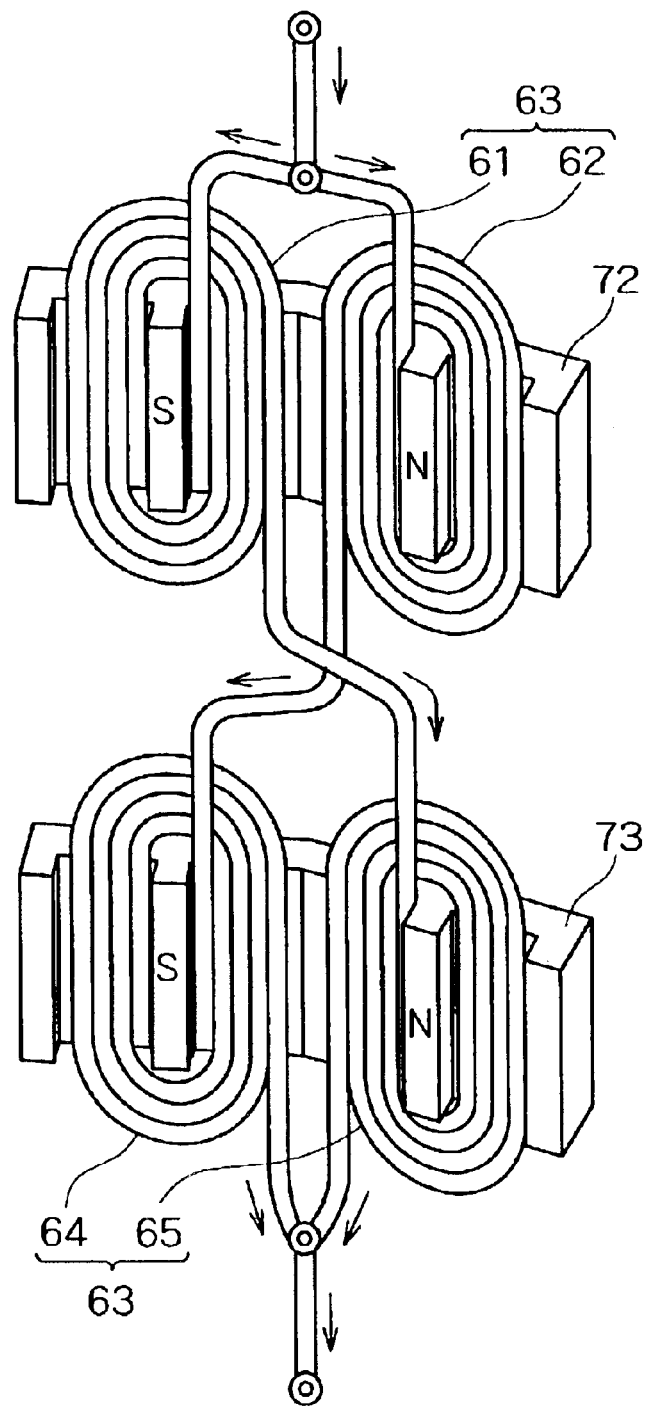
FIG. 28 is a drawing showing the arrangement of another raw tire-preheating apparatus in front view.

In the fourth embodiment, the set of the upper coil 60 and the upper core 72 is arranged such that it shifts relative to the set of the lower coil 63 and the lower core 73 in the circumferential direction of the tire. The present invention is not restricted to the arrangement. For instance, the upper coil 60 does not overlap the lower coil 63 in any arrangement, these coils 60 and 63 are arranged such that they are shifted to each other not in the circumferential direction of the raw tire 4, but in the tire width direction, as shown in FIG. 28. However, in order to avoid the mutual interference, the upper coil 60 and the lower coil 63 should be arranged such that the magnetic poles in both the coils 60 and 63 are aligned in the same direction, as shown in FIG. 28.

Figure 29:
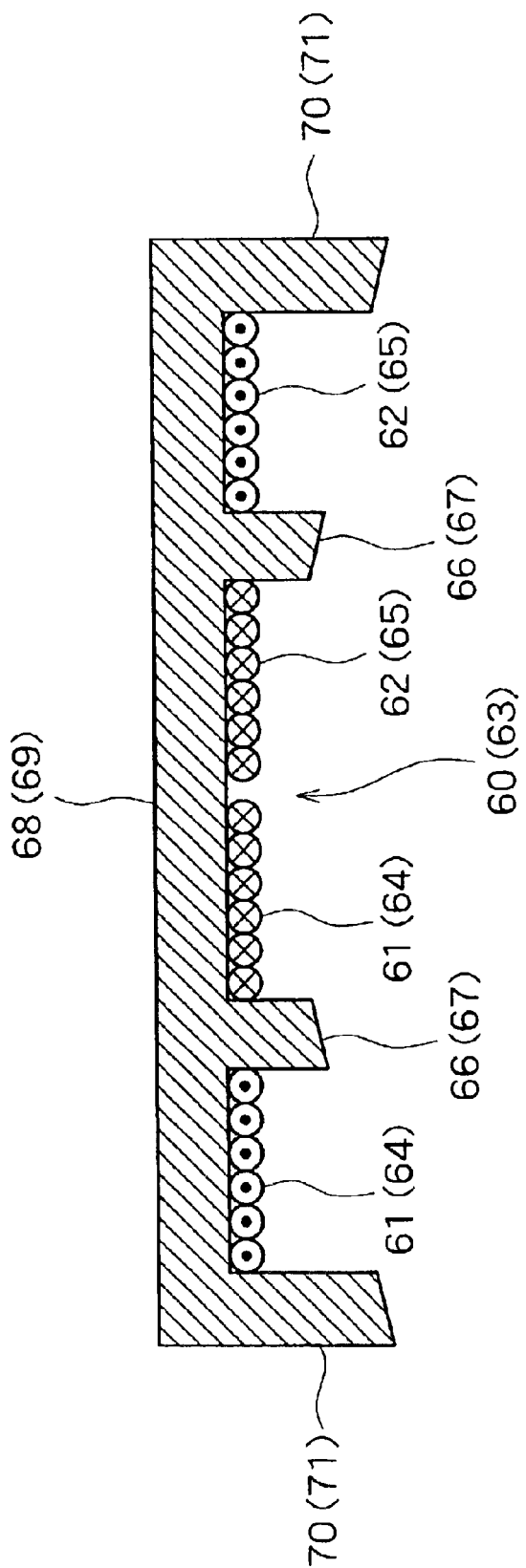
FIG. 29 is a sectional view of the arrangement of a set of coils and cores.

In the fourth embodiment, the upper core 72 and the lower core 73 are formed such that they are curved in the form of a V shape in accordance with the curvature of the outer circumference of the raw tire 4, as shown in FIG. 27. The present invention is not restricted to such an arrangement. It is possible that the rear cores 68, 69 is formed in the shape of a straight line and the center cores 66, 67 and that the side cores 70, 71 are formed such that they approach the raw tire 4, as shown in FIG. 29.

In the fourth embodiment, each coil section 61, 62, 64, 65 is constituted by winding a conductor in an annular ellipse form. The present invention is not restricted to this form. For instance, an annular circle loop or an annular rectangle loop can be employed.

In the fourth embodiment, moreover, the two sets of the coil and the core are provided for the upper and lower positions. The present invention is not restricted to such an arrangement. For instance, another set of a coil and a core can be disposed in the center portion of the tread section 4a in the raw tire 4, adding to the upper and lower sets of the coil and the core.

By induction heating the raw tire 4 with the raw tire-preheating apparatus 1, the thermal properties as for the temperature rise were investigated for both end parts ("top" and "bottom") and the middle part ("center"). The results obtained by preheating with the raw tire-preheating apparatus 1 according to the fourth embodiment are shown in FIG. 30. It is found that the raw tire can be preheated uniformly overall; the temperature is the same as for both end parts and the middle part and the rate of temperature up is also the same as for these parts.

As shown in FIGS. 25 to 27, the raw tire-preheating apparatus 1 according to the fourth embodiment comprises a set of the upper coil 60 disposed to face the upper shoulder part 4d' for generating the high frequency magnetic field to apply it to the upper shoulder part 4d' and the upper core 72 (center cores 66, rear core 68 and side cores 70) made of a ferromagnetic material having a low electrical conductivity to absorb the high frequency magnetic field; and a set of the lower coil 63 disposed to face the lower shoulder part 4d for generating the high frequency magnetic field to apply it to the lower shoulder part 4d and the lower core 73 (center cores 67, rear core 69 and side cores 71) made of a ferromagnetic material having a low electrical conductivity to absorb the high frequency magnetic field. The sets are disposed in the width direction of the raw tire 4, such that they are shifted at positions different from each other in the circumferential direction. Thus, the method for preheating the raw tire is realized, wherein the high frequency magnetic field has such an intensity distribution that it concentrates onto the upper and lower shoulder parts 4d and 4d', thereby the center part of the tread section 4a to be heated in a reduced intensity.

Moreover, as shown in FIG. 26, the coil part 61 and the coil part 64 as well as the coil part 62 and the coil part 65 are connected in series to each other, and at the same time, the coil part 61 and the coil part 62 as well as the coil part 64 and the coil part 65 are connected in parallel to each other. This circuit arrangement ensures suppressing a marked increase in the coil inductance as well as the unbalance of the magnetic flux density resulting from the unbalance between the branching currents in the parallel connection, thereby enabling the heat unbalance to be removed.

Industrial Applicability

As described above, the method and the apparatus for preheating the raw tire according to the present invention are suitable for preheating the raw tire with a decreased running cost.

We claim:

1. A raw tire-preheating apparatus for preheating a raw tire by the induction heating of metallic elements embedded in the inside of the raw tire between an outer surface and an inner surface of the raw tire, said apparatus comprising:
   a coil disposed to face said raw tire for generating a high frequency magnetic field to apply it to said raw tire; and
   a core made of a ferromagnetic material having a low electrical conductivity, wherein said core includes means for providing a non-uniform intensity distribution of the high frequency magnetic field to uniformly preheat the overall area of said raw tire.

2. A raw tire-preheating apparatus for preheating a raw tire by the induction heating of metallic elements embedded in the inside of the raw tire, said apparatus comprising:
   a tread section-preheating mechanism including a front coil disposed to face a tread section for generating a high frequency magnetic field to apply it to said tread section; and
   a core mechanism made of a ferromagnetic material having a low electrical conductivity and comprising means to selectively absorb the high frequency magnetic field, such that said tread section is preheated uniformly overall in the tire width direction; and
   a movement mechanism for moving at least one of said tread section-preheating mechanism and said raw tire such that said tread section-preheating mechanism is move along the tread section.

3. The raw tire-preheating apparatus according to claim 2, wherein said core mechanism includes a shield core interposed between said tread section and said rear coil to face an inside part of said tread section.

4. The raw tire-preheating apparatus according to claim 2, wherein said front coil is disposed such that the opening thereof faces said tread section, wherein said core mechanism includes a shield core interposed between said tread section and said rear coil so as to face an inside part of said tread section; and center cores disposed in said opening such that the front-end surfaces thereof are positioned close to the outside part of said tread section.

5. The raw tire-preheating apparatus according to claim 2, wherein said core mechanism includes a shield core interposed between said tread section and said rear coil to face an inside part of said tread section; and side cores disposed on both side surfaces of the front coil such that the front-end surfaces thereof are positioned close to the outside parts of said tread section.

6. The raw tire-preheating apparatus according to claim 2, wherein said front coil is disposed such that the opening thereof faces said tread section, wherein said core mechanism has core blocks, whose front-end surface are gradually closer to said tread section from an inside part to an outside part of said tread section in said opening.

7. The raw tire-preheating apparatus according to one of claim 2, wherein, a plurality of said tread section-preheating mechanisms are disposed along said tread section.

8. A raw tire-preheating apparatus for preheating a raw tire by the induction heating of metallic elements embedded in the inside of the raw tire, said apparatus comprising:
   a tread section-preheating mechanism including a front coil and a rear coil disposed to face a tread section for generating a high frequency magnetic field to apply it to said tread section;
   a core mechanism made of a ferromagnetic material having a low electrical conductivity and including a shield core interposed between said tread section and said rear coil to face an inside part of said tread section; and
   a movement mechanism for moving at least one of said tread section-preheating mechanism and said raw tire such that said tread section-preheating is moved along the tread section.

9. The raw tire-preheating apparatus according to claim 8, wherein said front coil is disposed such that the opening thereof faces said tread section, and
   center cores disposed in said opening such that the front-end surfaces thereof are positioned close to the outside part of said tread section.

10. The raw tire-preheating apparatus according to claim 8, further comprising:
   center cores disposed in said opening such that the front-end surfaces thereof are positioned close to the outside part of said tread section.

11. The raw tire-preheating apparatus according to claim 8, wherein said front coil is disposed such that the opening thereof faces said tread,
   wherein said core mechanism has core blocks, whose front-end surfaces are gradually closer to said tread section from the inside part of the outside part in said opening.

12. The raw tire-preheating apparatus according to claim 8, wherein a plurality of said tread section-preheating mechanism are dispose along said tread section.

13. A raw tire-preheating apparatus for preheating a raw tire by the induction heating of metallic elements embedded in the inside of the raw tire between an outer surface and an inner surface of the raw tire, said apparatus comprising:
   coil means disposed to face said raw tire for generating a high frequency magnetic field and for applying it to said raw tire; and
   core means made of a ferromagnetic material having a low electrical conductivity, whereby more than two sets of said coil means and said core means are disposed in the width direction of said raw tire and are positioned in a shifted position different from each other.

* * * * *